United States Patent
Grandhi et al.

(10) Patent No.: US 11,003,484 B2
(45) Date of Patent: May 11, 2021

(54) INTER-PROCESSOR INTERRUPT VIRTUALIZATION WITH PASS-THROUGH OF LOCAL INTERRUPT CONTROLLER

(71) Applicant: Intel Corporation, Santa Clara, CA (US)

(72) Inventors: Sainath Grandhi, Hillsboro, OR (US); Xuefei Xu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 16/457,422

(22) Filed: Jun. 28, 2019

(65) Prior Publication Data

US 2020/0409735 A1    Dec. 31, 2020

(51) Int. Cl.
*G06F 9/455*     (2018.01)
*G06F 9/48*      (2006.01)

(52) U.S. Cl.
CPC ........ *G06F 9/45558* (2013.01); *G06F 9/4812* (2013.01); *G06F 2009/45583* (2013.01)

(58) Field of Classification Search
CPC .................................................. G06F 9/45558
See application file for complete search history.

(56) References Cited

U.S. PATENT DOCUMENTS

| 9,697,151 B2 * | 7/2017 | Moyer | ..................... G06F 13/24 |
| 9,727,500 B2 * | 8/2017 | Moyer | ..................... G06F 13/24 |
| 2015/0026678 A1 | 1/2015 | Imada et al. | |
| 2015/0121377 A1 | 4/2015 | Zang et al. | |
| 2016/0224484 A1 | 8/2016 | Bonzini et al. | |

FOREIGN PATENT DOCUMENTS

| WO | 2017/049584 A1 | 3/2017 |
| WO | 2019/001434 A1 | 1/2019 |

OTHER PUBLICATIONS

European Search Report and Search Opinion, EP App. No. 20164473.9, dated Sep. 18, 2020, 8 pages.

* cited by examiner

*Primary Examiner* — Charlie Sun
(74) *Attorney, Agent, or Firm* — Nicholson De Vos Webster & Elliott LLP

(57) ABSTRACT

A processor includes cores and instructions executable by at least one of the plurality of cores as a virtual machine monitor (VMM). To configure resources for a virtual machine (VM), the VMM is to: group the cores into cluster(s), where a subset of the cores is to execute the VM; create, within a buffer in memory, a data structure to store, for the subset, one or more entries, each entry including a cluster identifier and a bitmap. The bitmap identifies cores of the subset within a cluster corresponding to the cluster identifier. The VMM is further to write, to a virtual machine control structure (VMCS): a pointer to the data structure, wherein the pointer includes a physical address of the memory; and a number of the one or more entries in the data structure; and set, within the VMCS, a local interrupt controller pass-through field.

24 Claims, 19 Drawing Sheets

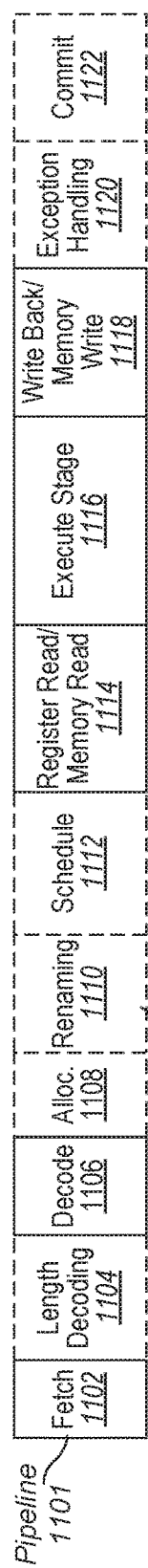
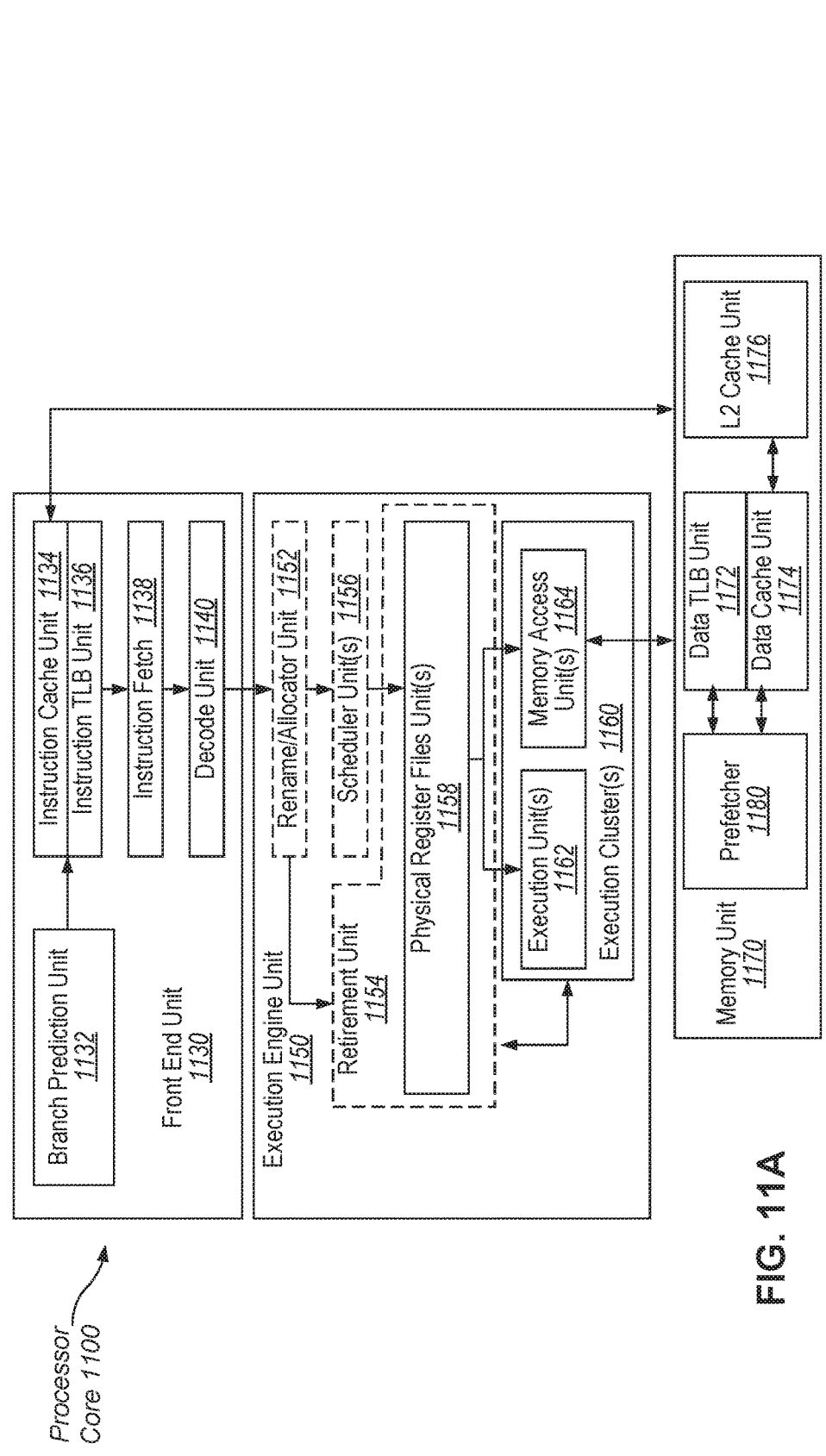
FIG. 11B
FIG. 11A

INTER-PROCESSOR INTERRUPT VIRTUALIZATION WITH PASS-THROUGH OF LOCAL INTERRUPT CONTROLLER

TECHNICAL FIELD

The disclosure pertains to computer systems, more specifically, to inter-processor interrupt (IPI) virtualization with pass-through of local interrupt controller.

BACKGROUND

Modern computing systems employ virtualization that emulates hardware for purposes of security. Virtual machines (VMs) running embedded or real-time applications on emulated hardware may need exclusive access to resources like one or more processor core(s), memory, or input/output (I/O) devices for reasons of performance, while maintaining isolation benefits provided by virtualization technology. In such situations, virtual machine monitors (VMMs), also known as hypervisors, may choose not to trap and emulate a VM's access to local Advanced Programmable Interrupt Controller (LAPIC), providing local APIC pass-through to VM's. The local APIC is designed as an intermediary of inter-processor interrupts (IPIs) between interrupt sources (e.g., a processor's interrupt pins, from internal sources, and from external I/O devices) and a destination core (of multiple cores) that is to receive the IPI. Providing local APIC pass-through to VMs, however, may come at the cost of security. For example, the VMs could issue an interrupt storm (similar to a denial-of-service attack) by issuing IPIs to processors on a platform running either other VMs or a host operating system.

BRIEF DESCRIPTION OF THE DRAWINGS

FIG. 11A is a block diagram illustrating a micro-architecture for a processor in which one implementation of the disclosure may be used.

FIG. 11B is a block diagram illustrating an in-order pipeline and a register renaming stage, out-of-order issue/execution pipeline implemented according to at least one implementation of the disclosure.

DETAILED DESCRIPTION

Figure 1A:
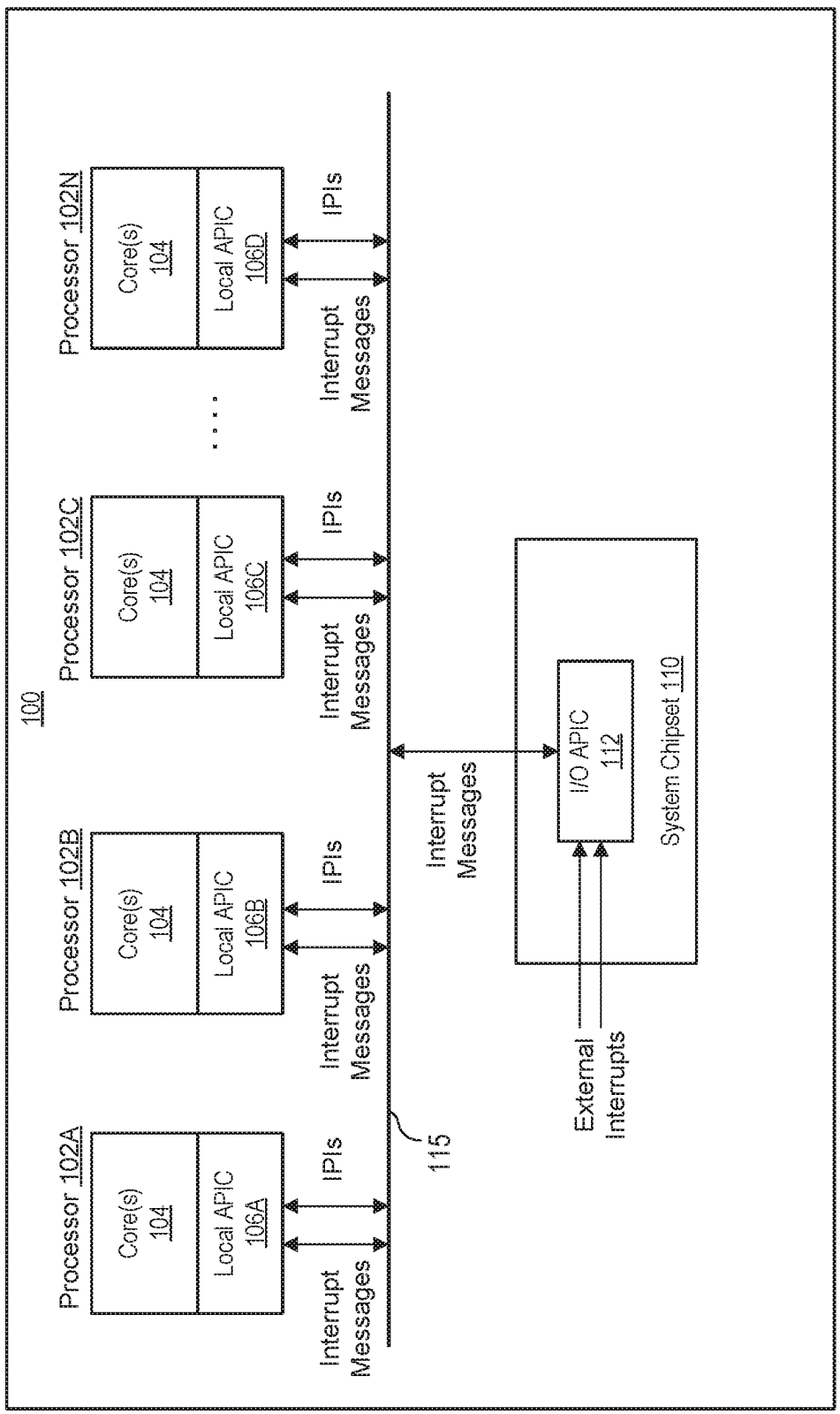
FIG. 1A is a block diagram illustrating a computing platform having processors that employ local advanced programmable interrupt controllers (APIC), according to one implementation.

Aspects of the disclosure are directed to a system and methods for enhancing local advanced programmable interrupt controller (APIC) logic in order for a virtual machine monitor (VMM) to provide local APIC pass-through to one or more virtual machines (VMs). Pass-through of the local APIC means that the VMM need not trap and emulate the functioning of the local APIC (e.g., via virtualization of the local APIC) for the VM to send inter-processor interrupts (IPIs) to core(s) on which the VM is executing. In order to provide such pass-through of the local APIC to the VM, the VM is to be trusted in terms of allowing the VM to directly issue IPIs that are forwarded to destination core(s). A VM is generally trusted to send IPIs to the same core(s) on which the VM is executing.

System software (e.g., a guest operating system (OS) or other application of the VM) may write to an interrupt command register (ICR) to send IPIs between cores. In a configuration where the VMM provides direct access to the local APIC to a VM, the writes to the ICR may be virtualized in the processor in order to verify that the IPI is directed to a core on which the VM is executing. Any core of a subset of cores on which the VM is executing is a valid (or authorized) destination to which the VM may send an IPI. To check that a core is a valid destination, APIC identifiers (IDs) of the cores within the subset of cores (for a the VM) may be associated, in a data structure stored in a memory buffer, with a cluster identifier (ID) of a cluster within the subset of cores. In this way, the data structure may embody a local APIC processor map for each VM on a computing platform. In one embodiment, the data structure is a table, for example. This data structure may be cross-referenced against the values stored within the ICR before the IPI is forwarded on a system bus that couples together the multiple cores of a multi-core processor.

In various implementations, the VMM groups multiple cores into one or more clusters, where a subset of the cores is to execute the VM. The VMM may further create, within a buffer in memory, a data structure to store, for the subset of the cores, one or more entries, each entry including a cluster identifier and a bitmap of local interrupt controller IDs. The bitmap may identify cores of the subset of the cores within a cluster corresponding to the cluster identifier. The VMM may further write, to a virtual machine control structure (VMCS), a pointer to the data structure, e.g., that includes a physical address of the memory, and a number of the one or more entries in the data structure. The VMM may further set, within the virtual machine control structure, a local interrupt controller pass-through field to indicate virtualization pass-through of the local APIC for the VM. This allows the VMM to virtualize a check, via the VMCS, of the data structure to ensure a future IPI is directed at an authorized core for the particular VM.

In implementations, to send an IPI to one or more of the cores, a guest OS of the VM may write values to the ICR. These values include, for example, values for a destination field that identifies one or more destination cores; for a destination mode (either physical or logical); and for a destination shorthand (e.g., self, all including self, or all excluding self with reference to the core that initiates the IPI). The local APIC may then, as part of handling such an IPI stored in the ICR, verify that the local interrupt controller pass-through field has been set and that the pointer and the number of the one or more entries in the VMCS are non-zero. This signals to local APIC logic that virtualization pass-through of the local APIC is enabled and set up. The local APIC logic may then be employed to determine, with access to the data structure previously set up by the VMM in memory (to which the pointer is directed), whether an IPI that has been written to the ICR is directed to an authorized core of the subset of cores for the VM that stored the values in the ICR. In this way, no VM can send a storm of IPIs (e.g., perform a denial-of-service type of attack) to cores outside of its domain.

These proposed solutions have several advantages over the conventional system and methods in allowing VMs direct access to local APIC, which improves performance compared to VMs that go through VMM virtualization of local APIC. Additionally, security is ensured by managing the cores to which any given VM can send an IPI, e.g., the subset of the cores on which the VM is currently running. This prevents issues with denial-of-service attacks by other VMs that are running on the same platform. Implementations of the disclosure may also encourage use of virtualization technology for critical applications such as autonomous driving without security concerns. Further, the buffering or caching of the data structure that stores the local APIC map includes minimal overhead within a few processor cycles.

FIG. 1A is a block diagram illustrating a computing platform 100 (e.g., system) having processors 102A, 102B, 102C, ... 102N that employ local advanced programmable interrupt controllers (APIC) 106A, 106B, 106C, ... 106N, respectively, according to one implementation. The local APIC may variably be referred to as a local interrupt controller or programmable interrupt controller for simplicity. Each processor may include one or more cores 104, and thus be a multi-core processor. The computing platform 100 may further include a system chipset 110 that includes an I/O APIC 112, which may generate I/O interrupts based on external interrupts or internal signals from the computing platform 100.

In implementations, the computing platform 100 may further include a system bus 115 that is to couple the processors 102, the cores 104, and the system chipset 110. Interrupt messages may be sent back and forth between the system bus 115 and the I/O APIC 112 of the system chipset 110, for example. Interrupt messages and IPIs may also be sent between the local APICs and the system bus 115, and therefore may be sent between the processors and the cores.

In various implementations, each local APIC 106A, 106B, 106C, ... 106D handles interrupts from the I/O APIC 112, IPIs from processors on the system bus 115, and self-generated interrupts. Interrupts may also be delivered to the individual processors through local interrupt pins; however, this mechanism is commonly not used in multi-processor systems. The IPI mechanism is typically used in multi-processor systems to send fixed interrupts (interrupts for a specific vector number) and special-purpose interrupts to processors on the system bus 115. For example, a local APIC can use an IPI to forward a fixed interrupt to another processor for servicing. Special-purpose IPIs (including non-maskable interrupt (NMI), initialization interrupt (INIT), system management interrupt (SMI), and startup inter-processor interrupt (SIPI) IPIs) allow one or more processors on the system bus to perform system-wide boot-up and control functions.

Figure 1B:
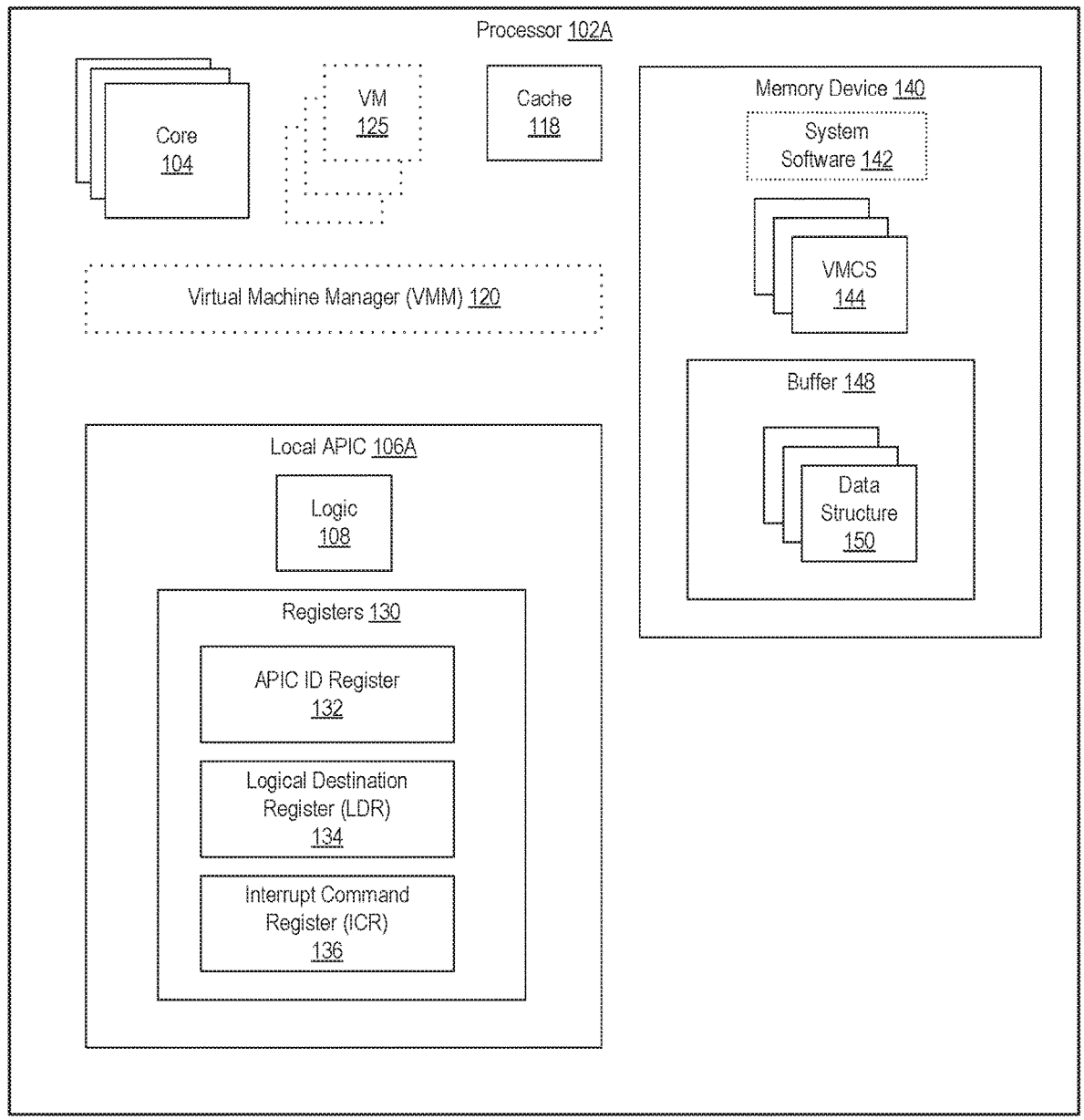
FIG. 1B is block diagram illustrating one of the processors illustrated in FIG. 1A, according to one implementation.

FIG. 1B is block diagram illustrating one of the processors 102A illustrated in FIG. 1A, according to one implementation. The processor 102A includes one or more cores 104, cache 118, the local APIC 106A (e.g., local interrupt controller), and a memory device 140 (e.g., memory). The one or more cores 104 may execute a virtual machine monitor (VMM) 120 and one or more virtual machine (VMs) 125.

Figure 4:
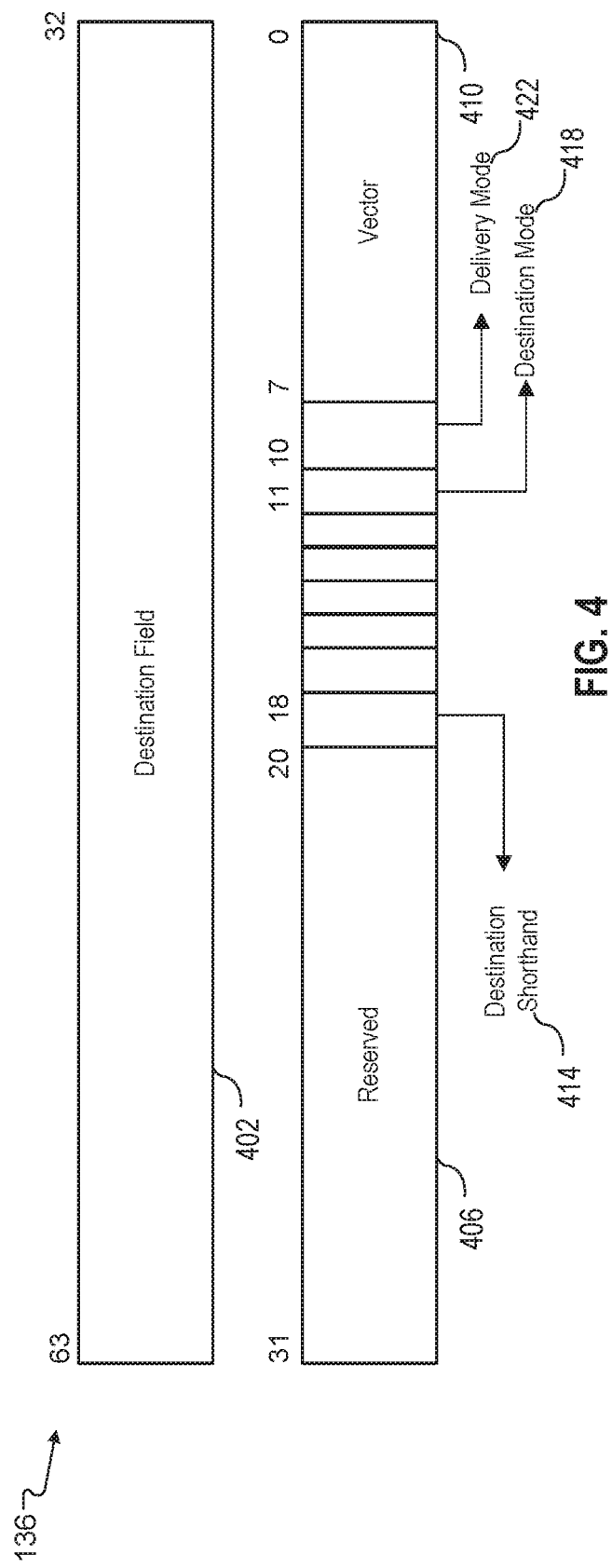
FIG. 4 is a diagram of a format structure for an interrupt command register (ICR) into which a guest of a VM is to write to send an IPI to a destination core according to one implementation.

In various implementations, the local APIC 106A includes interrupt controller logic 108, which includes local APIC pass-through logic, and a number of registers 130, such as model-specific registers (MSRs). The interrupt controller logic 108 may be hardware, firmware, or a combination of hardware and firmware. The registers 130 may include, but are not limited, to an APIC ID register 132, a local destination register (LDR) 134, and an interrupt command register (ICR) 136. The APIC ID register 132 may store one or more interrupt controller IDs, each of which is related to a core 104 or a cluster of cores 104. A cluster is also referred to as a logical processor, and be identified as the entity on which one or more software programs execute, such as the VM 125. The LDR 134 may store a logical value that is associated with two separate identifiers, including the cluster ID and the APIC ID, which may be read by software running on the VM 125. The LDR 134 is discussed in more detail with reference to FIG. 2. The ICR 136 is writable by the VM 125 in order to send an IPI onto the system bus 115. The ICR 136 is illustrated in FIG. 4 and discussed in more detail hereinafter.

In implementations, the memory device 140 is to store system software 142, a VMCS 144 for each VM 125, and a buffer 148. The buffer 148 may be partitioned into one or more data structures 150, such as a table or indexed/partitioned portion of memory. The data structure 150 may also be stored in a register, whether an MSR or a memory-based register, in other implementations. In implementations, the memory device 130 is any of dynamic random access memory (DRAM), synchronous DRAM (SDRAM), a static memory, such as static random access memory (SRAM), a flash memory, a data storage device, or a combination of such memory devices. For brevity, the memory device 140 is also simply referred to as memory 140. As discussed, the VMM 120 may store values in the VMCS 144 to set up virtualization of local APIC pass-through. These values may include a physical address of a pointer to the data structure, a number of the one or more entries in the data structure, and a setting or flag for a local interrupt controller pass-through field that, when set, may indicate virtualization pass-through of the local APIC for the VM.

The interrupt controller logic 108 may access the values stored in the ICR 136 in addition to those stored in the VMCS 144 for a particular VM 125 in order to decide whether an IPI written to the ICR 136 may be sent onto the system bus 115. For example, if the interrupt controller logic 108 verifies that the destination core of the IPI is included within the subset of the cores that execute the VM 125, the IPI written to the ICR 136 may be sent to the destination core on the system bus 115.

Figure 1C:
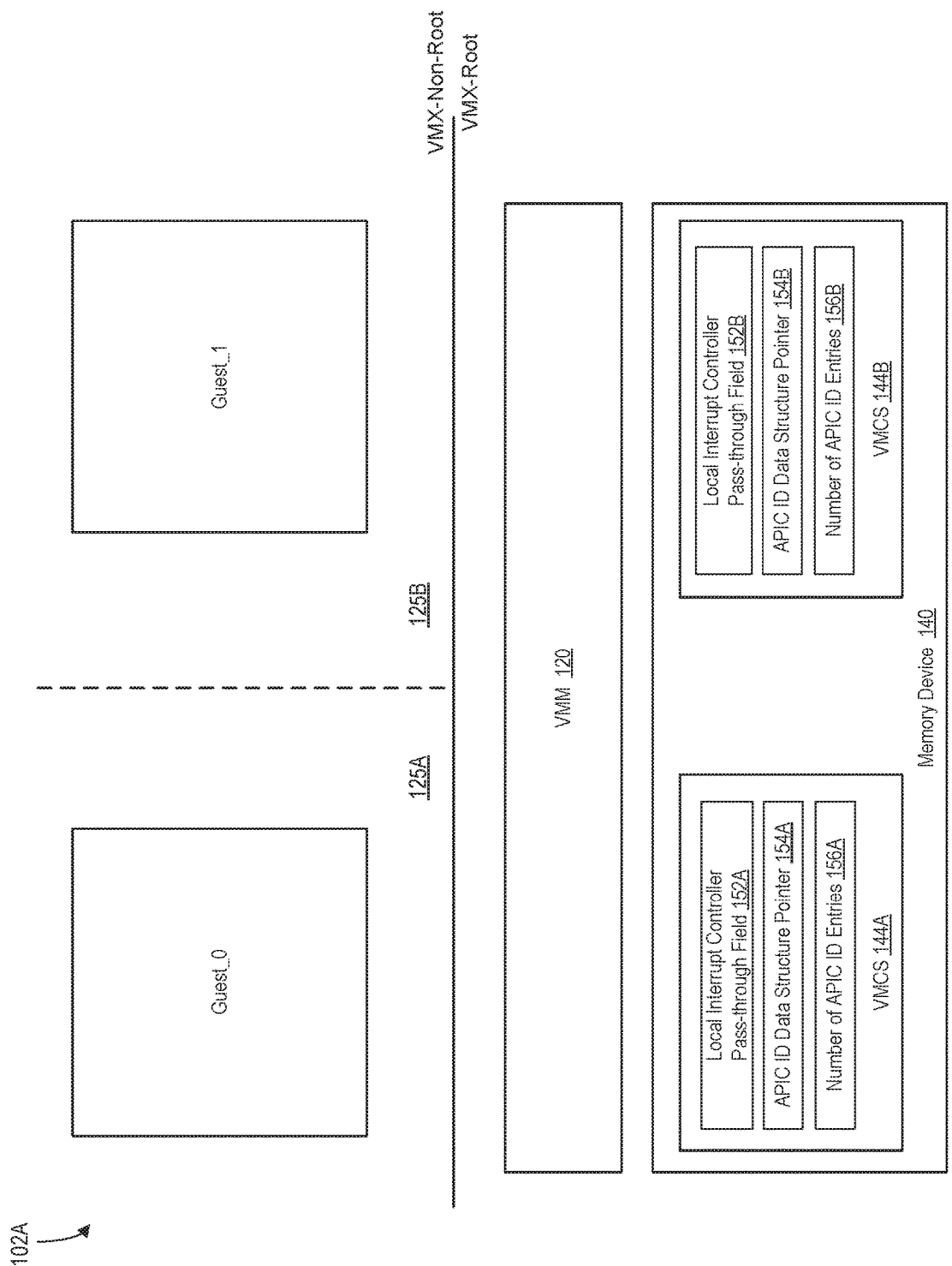
FIG. 1C is a block diagram of a virtual machine monitor (VMM) running two VMs with access to a virtual machine structure for each VM, according implementations.

FIG. 1C is a block diagram of the VMM running two VMs, e.g., a first VM 125A and a second VM 125B with access to a virtual machine structure (VMCS) for each VM, according to implementations of the disclosure. The first VM 125A may execute a first guest OS (guest_0) and the second VM 125B may execute a second guest OS (guest_1). In configuring hardware and software resources for each VM, the VMM 120 may set up a first VMCS 144A for the first VM 125A and a second VMCS 144B.

As part of the configuration for the first VM 125A, implementations of the disclosure include the VMM 120 setting (or not setting) a value or flag of a first local interrupt controller pass-through field 152A, a value for a first APIC ID data structure pointer 154A, and a value of a first number of APIC ID entries 156A. As part of the configuration for the second VM 125B, implementations of the disclosure include the VMM 120 setting (or not setting) a value or flag of a second local interrupt controller pass-through field 152B, a value for a second APIC ID data structure pointer 154B, and a value of a second number of APIC ID entries 156B.

Figure 2:
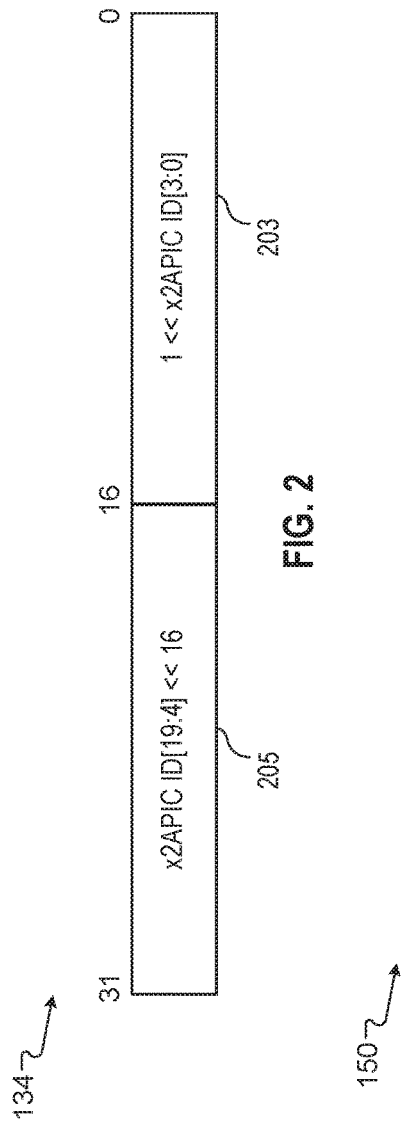
FIG. 2 is a diagram of a format structure for a logical destination register (LDR) of a local APIC, according to one implementation.

FIG. 2 is a diagram of a format structure for the logical destination register (LDR) 134 of a local APIC, according to one implementation. The format structure may be a 32-bit logical x2APIC ID that includes an interrupt controller ID subfield 203 and a cluster ID subfield 205, each of which are 16-bit subfields. In other implementations, these subfields may vary in size and allocation, so the illustrated format is but one example. In one implementation, the value for the interrupt controller ID subfield 203 is derived by shifting one ("1") left by the lowest four bits of the x2APIC ID, e.g., the logical interrupt controller ID is 1<<x2AIC ID[3:0]. The remaining bits of the x2APIC ID, e.g., x2APIC ID[19:4] may then form the cluster ID subfield 205 by being shifted into the [31:16] bits of the cluster ID subfield 205. In this way, the software being executed on the VM's (e.g., in non-root mode of virtualization) may read the values for the interrupt controller ID and the cluster ID directly from the LDR 134.

Figure 3A:
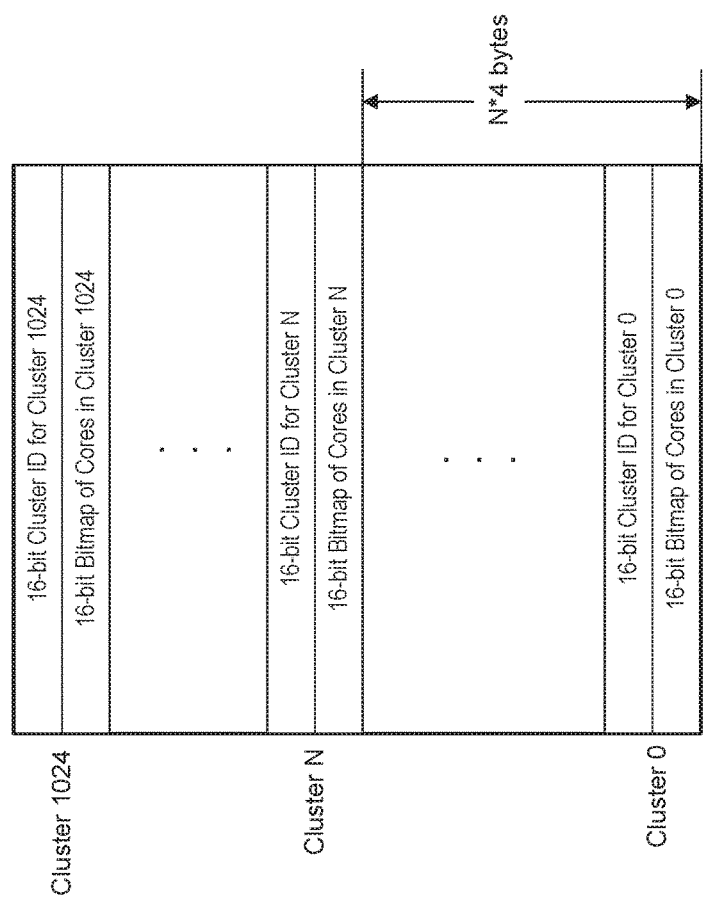
FIG. 3A is a diagram of a data structure built within a memory buffer for a VM that identifies a cluster identifier (of a subset of cores) and a bitmap that identifies cores of the subset of cores within a cluster corresponding to the cluster identifier in one implementation.
Figure 3B:
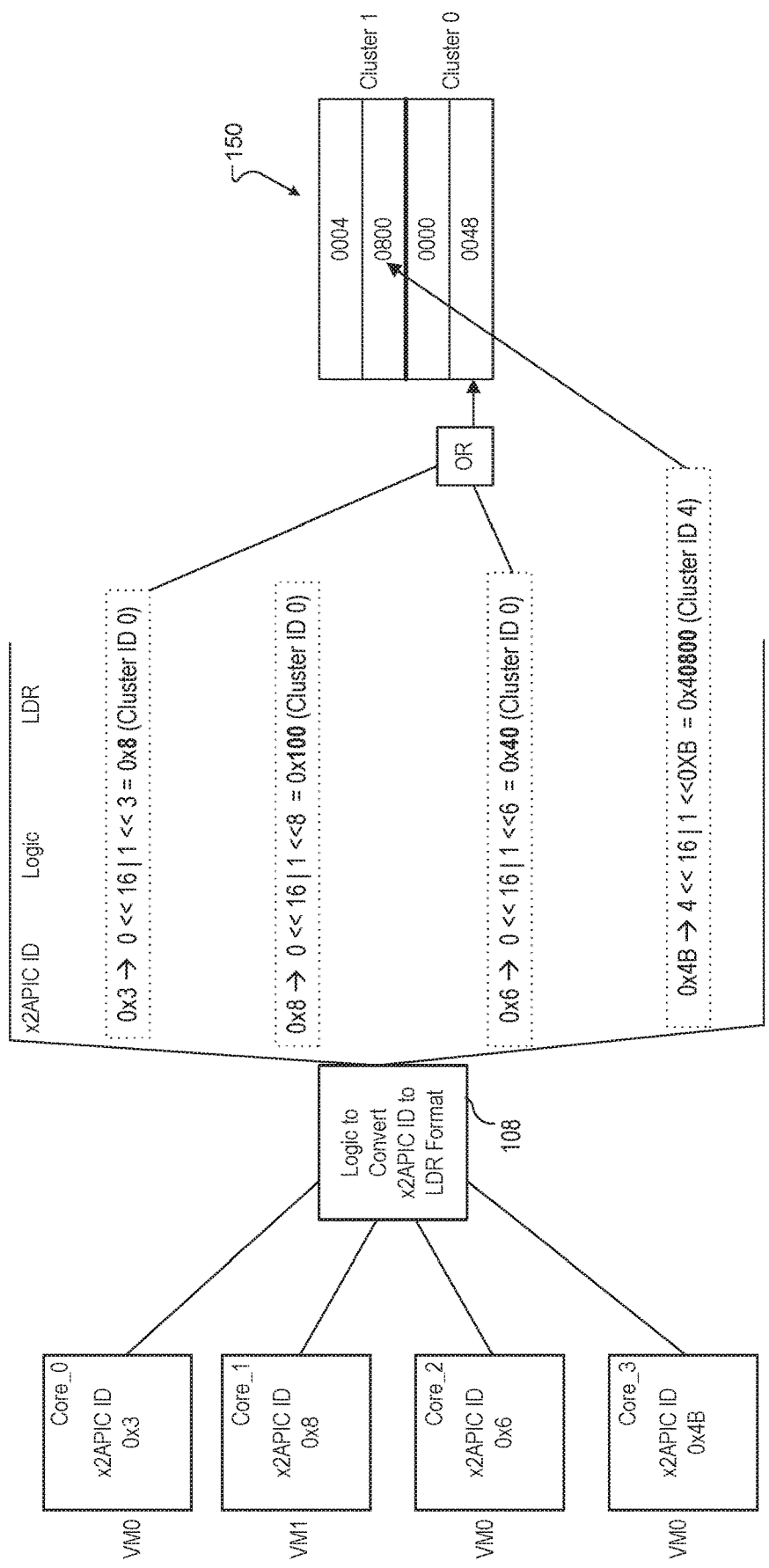
FIG. 3B is a logic flow diagram illustrating an example of how the data structure of FIG. 3A is created according to one implementation.

FIG. 3A is a diagram of the data structure 150 built within the memory buffer 148 (FIG. 1B) for the VM 125. Each entry that the VMM 120 stores in the data structure 150 require about four bytes of memory and represent a cluster. Accordingly, each entry may identify a cluster ID of the cluster and a bitmap that identifies cores of the subset of cores within the cluster corresponding to the cluster ID. As noted previously, the subset of cores are those that execute a particular VM 125. In this way, the VMM 120 may assign cores exclusively for the lifetime of the VM 125. To ensure the VMM 120 does not use these cores to run other VMs, the VMM 120 may group the cores (of the subset of cores) into their corresponding clusters, and create the data structure 150 by writing the entries that define the clusters and corresponding cores (e.g., via the bitmap) that execute the VM 125. FIG. 3B illustrates an example of the creation of a data structure 150 for a VM being executed by three cores.

FIG. 3B is a logic flow diagram illustrating an example of how the data structure of 150 FIG. 3A is created according to one implementation. Assume that a first VM (identified as VM0) is to be executed on three processor cores, including a first core (core_0), a second core (core_2), and a third core (core_3). The first core and second core may be grouped into cluster zero ("0") that has a cluster ID of zero and the third core may be grouped into cluster one ("1") that has a cluster ID of four.

In one implementation, the interrupt controller logic 108 may include logic to convert the x2APIC ID to LDR format as illustrated in FIG. 3B, where values are hexadecimal. The APIC ID of 0×3 of the first core may be converted to an interrupt controller ID of 0×8 and the APIC ID of 0×6 for the second core may be converted to an interrupt controller ID of 0×40. The interrupt controller logic 108 may perform a bitwise OR on these two values in order to generate a combined bitmap value of 0×48, or 0048. Accordingly, the entry for cluster zero includes two values, "0000" for cluster ID of zero and 0048 for the interrupt controller ID. The APIC ID of 0×4B of the third core may similarly be converted to an interrupt controller ID of 0×40800, e.g., that identifies cluster ID four ("4") at a bitmap of the interrupt controller ID of 0×0800. Accordingly, the entry for cluster one includes two values, "0004" for cluster ID of four and 0800 for the interrupt controller ID. The combination of these two entries forms the entire data structure 150 (e.g., APIC ID table) for VM0. Additional logic would be apparent to those skilled in the art for additional cores distributed across different or additional clusters.

FIG. 4 is a diagram of a format structure for the interrupt command register (ICR) 136 into which a guest of the VM 125 is to write to send an IPI to a destination core according to one implementation. The ICR 136 may be formatted in different sizes, but in one implementation, includes a 32-bit destination field 402, a 12-bit reserved field 406, an 8-bit vector field 410, and a number of smaller fields, of which includes a destination shorthand field 414, a destination mode field 418, and a delivery mode field 422.

In various implementations, the destination field 402 is programmed with a value that represents the interrupt controller (or APIC) ID of the destination core. The destination mode field 418 may be set to physical (e.g., "0") or logical (e.g., "1"), although these values may be reversed in an alternative embodiments. Further, the destination shorthand field 414 may be set to a value that represents one of the destination shorthand settings listed in Table 1, although these values may be changed or swapped in other embodiments.

TABLE 1

| Destination Shorthand Value | Description |
| --- | --- |
| 00 | No Shorthand |
| 01 | Self |
| 10 | All Including Self |
| 11 | All Excluding Self |

If the value for "no shorthand" is in the destination shorthand field 414, the interrupt controller logic 108 may read the destination core(s) from the destination field 414. This process varies depending on whether the destination mode field 418 is set to physical (see FIGS. 6-7) or logical (see FIGS. 8-9), as value in the destination field 402 is to first be converted before being used to determine the destination core(s). Otherwise, a destination shorthand approach will be taken with another setting, such as "self," "all including self," or "all excluding self."

With "self" set as the destination shorthand, the only destination core is the same core that issues the IPI, allowing software to interrupt the core on which it is executing. An APIC implementation is free to deliver the self-interrupt message internally or to issue the message to the system bus 115 and "snoop" (e.g., monitor) the system bus 115 as with any other IPI message. With "all including self" set as the destination shorthand, the IPI is sent to all cores in the system including the core sending the IPI.

With "all excluding self" set as the destination shorthand, the IPI is sent to all cores in a system with the exception of the core sending the IPI. Support for this destination shorthand in conjunction with the lowest-priority delivery mode is model specific. For some processors, when the "all excluding self" shorthand is used together with lowest priority delivery mode, the IPI may be redirected back to the issuing core. The flow of determining authorized cores for destination of the IPI for "all including self" and "all excluding self" will be discussed in more detail with reference to FIG. 10.

In various implementations, the delivery mode field 422 may be set to a number of values selected as illustrated in Table 2, although these values may be altered or interchanged in other implementations.

TABLE 2

| Delivery Mode Value | Description |
|---|---|
| 000 | Fixed |
| 001 | Lowest Priority |
| 010 | SMI |
| 011 | Reserved |
| 100 | NMI |
| 101 | INIT |
| 110 | Start Up |
| 111 | Reserved |

Figure 5:
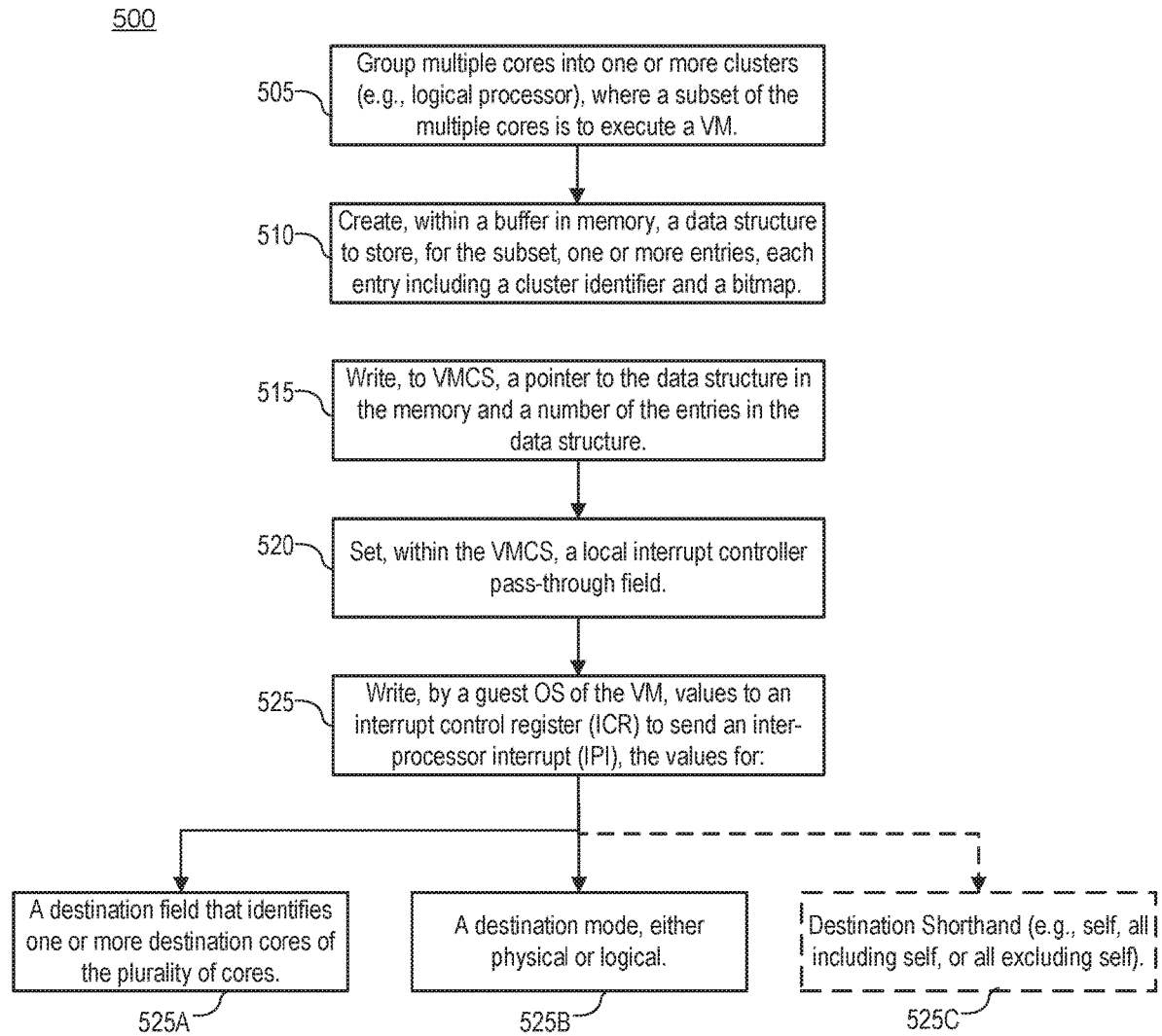
FIG. 5 is a flow chart of a method for setting up virtualization pass-through of a local APIC by a VMM and a VM, according to implementations.

FIG. 5 is a flow chart of a method 500 for setting up virtualization pass-through of a local APIC by a VMM and a VM, according to implementations. The method 500 may be performed by processing logic that may comprise hardware (e.g., circuitry, dedicated logic, programmable logic, microcode, etc.), firmware, or a combination thereof. In one implementation, the method 500 is performed by the VMM 120 being executed on at least one core of the multiple cores 104, with some aspects of the method 500 being performed by the guest OS 125A or 125B of one of the VMs.

With reference to FIG. 5, the method 500 may begin with the processing logic grouping the multiple cores into one or more clusters, wherein a subset of the multiple cores is to execute a virtual machine (VM) (505). The method 505 may continue with the processing logic creating, within a buffer in memory, a data structure to store, for the subset of the cores, one or more entries (510). Each entry may include a cluster identifier and a bitmap. The bitmap may identify cores of the subset of the multiple cores within a cluster corresponding to the cluster identifier. The method may continue with the processing logic writing, to a virtual machine control structure (VMCS), a pointer to the data structure, wherein the pointer comprises a physical address of the memory, and a number of the one or more entries in the data structure (515). The pointer may be the APIC ID data structure pointer 154A or 154B and the number of one or more entries may be the number of APIC ID entries 156A (FIG. 1C). the processing logic may continue with setting, within the VMCS, the local interrupt controller pass-through field 152A (525).

With continued reference to FIG. 5, the guest OS of the VM may then write values to an interrupt control register (ICR) to send an inter-processor interrupt (IPI) to one of more of the multiple cores that execute the VM (525). These values may be for a destination field that identifies one or more destination cores of the plurality of cores (525A); a destination mode including one of physical or logical (525B); and for a destination shorthand (525C). With the data structure 150 (e.g., table) in the buffer 148 in memory set up and these values in the VMCS populated, the processor 102A is ready to properly direct IPI's to cores that execute the VM, but not to other of the multiple cores 104 within the computing platform 100.

Figure 6:
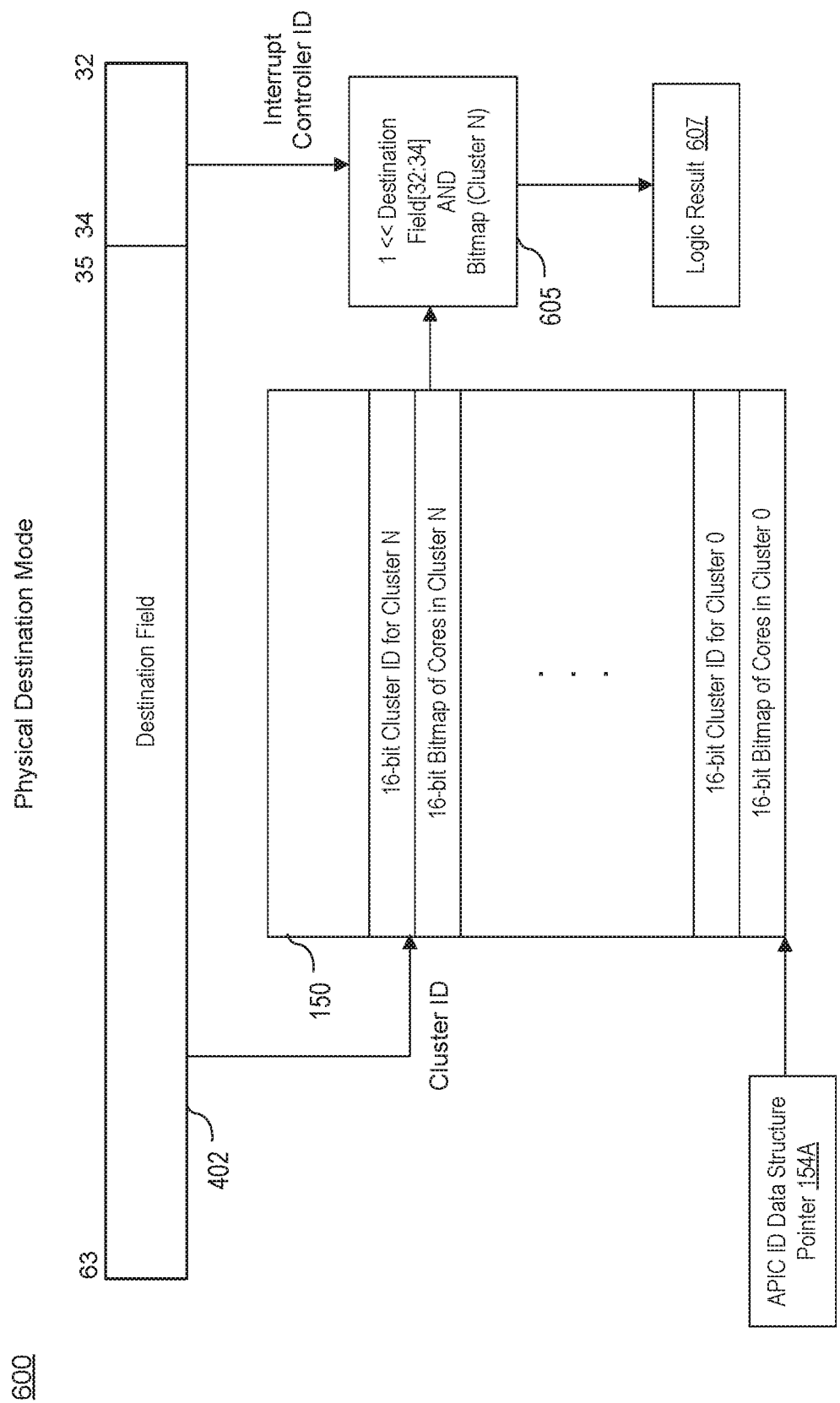
FIG. 6 is a logic flow diagram illustrating local APIC pass-through logic for a physical destination mode according to one implementation.

FIG. 6 is a logic flow diagram 600 illustrating local APIC pass-through logic (e.g., of the interrupt controller logic 108 of the local APIC 106A) for a physical destination mode according to one implementation. In one implementation of the local APIC pass-through logic, bits [34:32] of the destination field 402 of the ICR is programmed with the physical interrupt controller ID of the destination processor. The local APIC pass-through logic may then convert this physical interrupt controller ID into a corresponding cluster ID and interrupt controller ID within a particular cluster that has already been set up by the VMM, as was discussed. This conversion may be performed in a similar way that the APIC ID was converted for storage in the LDR 134, which was discussed in detail with reference to FIG. 2. The APIC ID data structure pointer 154A within the VMCS may then be used to link to the correct data structure 150 in memory, and from there to the correct cluster information corresponding to the cluster ID obtained from the destination field 402.

In various implementations, the bitmap for the cores of the subset of the multiple cores is read out of the data structure 150 (e.g., the bitmap associated with that cluster ID) and compared with the interrupt controller ID via a bitwise AND operation 605 to generate a logic result 607. If the logic result 607 is true (e.g., a non-zero value), then the IPI message with the information from the ICR is sent onto the system bus 115. If, however, the logic result 607 is false (e.g., a zero value), then the values written to the ICR are discarded and the IPI message is not sent onto the system bus 115.

Figure 7:
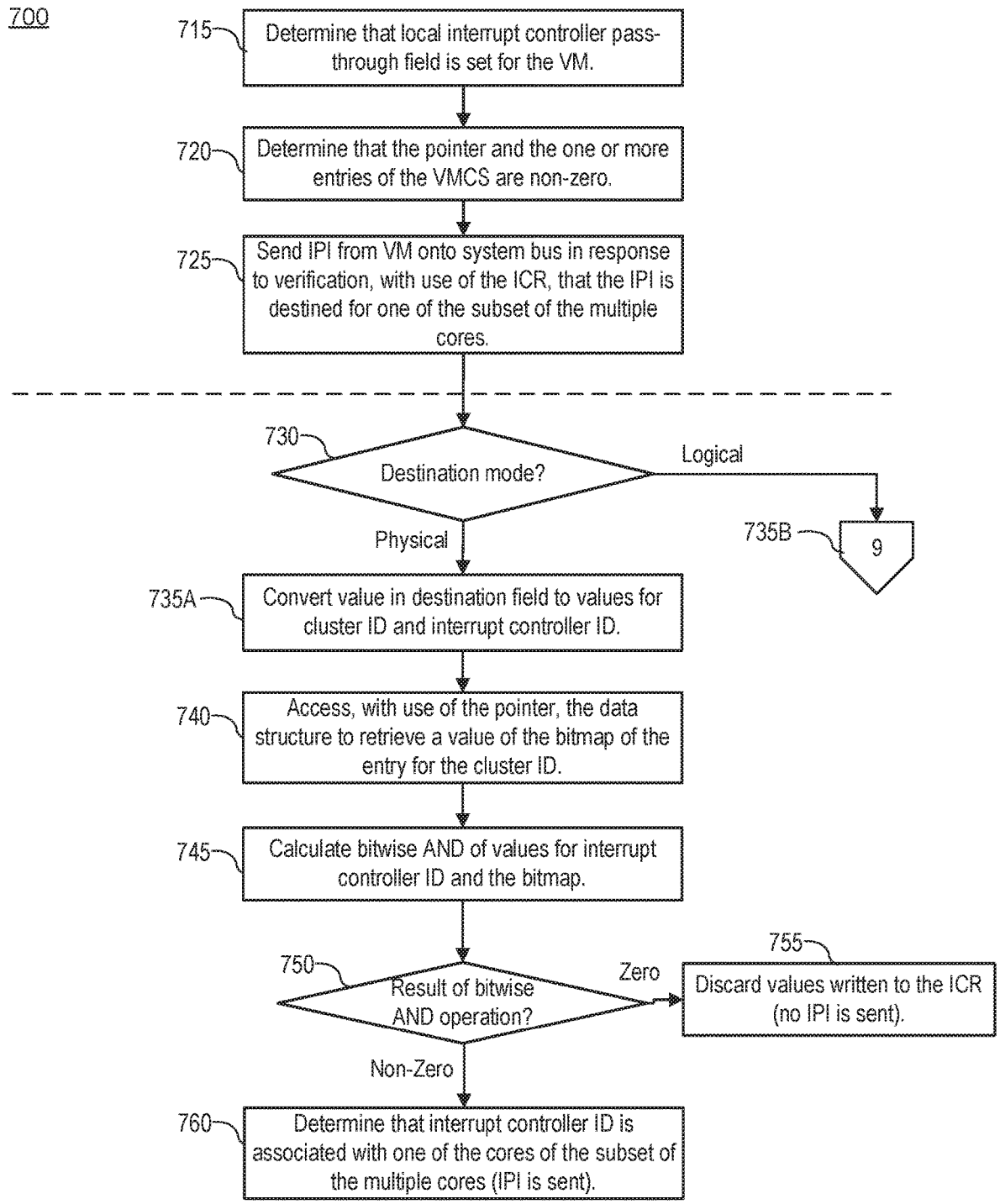
FIG. 7 is a flow chart of a method for implementing local APIC pass-through logic for the physical destination mode according to one implementation.

FIG. 7 is a flow chart of a method 700 for implementing local APIC pass-through logic for the physical destination mode according to one implementation. The method 700 may be performed by processing logic that may comprise hardware (e.g., circuitry, dedicated logic, programmable logic, microcode, etc.), firmware, or a combination thereof. In one implementation, the method 700 is performed by the APIC logic 106A, or more particularly, by the interrupt controller logic 108 with reference to the values in one or more of the registers 130.

With reference to FIG. 7, the method 700 may begin with the processing logic determining that the local interrupt controller pass-through field is set for the VM (715). The method 700 may continue with the processing logic determining that the pointer (e.g., APIC ID data structure pointer 154A) and the number of the one or more entries (e.g., number of APIC ID entries 156A) of the virtual machine control structure (VMCS) are non-zero (720). The method 700 may continue with the processing logic sending the IPI onto the system bus that couples the multiple cores in response to verification, with use of the ICR, that the IPI is destined for one of the subset of the multiple cores (725).

With continued reference to FIG. 7, the verification just mentioned may be performed with the additional steps below the dashed line. For example, the method 700 may continue with the processing logic determining the destination mode, e.g., by reading the destination mode field 418 from the ICR (730). If the destination mode is logical, the method 700 may continue with the processing logic continuing with the method 900 of FIG. 9 (735B). If the destination mode if physical, the method 700 may continue with the processing logic converting a value in the destination field 402 into values for the cluster identifier (ID) of a cluster and an interrupt controller ID within the cluster of the one or more clusters (735A). The method 700 may continue with the processing logic accessing, with use of the pointer, the data structure to retrieve a value of the bitmap of the entry corresponding to the cluster identifier (740). The method 700 may continue with the processing logic calculating a bitwise AND of the values for the interrupt controller ID and the bitmap of the entry (745).

With continued reference to FIG. 7, the method 700 may continue with the processing logic determining the result of the bitwise AND operation (750). If the result is a zero value, the method 700 may continue with the processing logic discarding the values written to the ICR, and thus no IPI is sent onto the system bus (755). If the result is no-zero, the method 700 may continue with the processing logic determining that the interrupt controller ID is associated with one of the cores of the subset of the multiple cores, and thus the IPI is sent onto the system bus (750). The IPI may be sent by sending the values in the ICR as a package onto the system bus 115 directed to the destination core.

Figure 8:
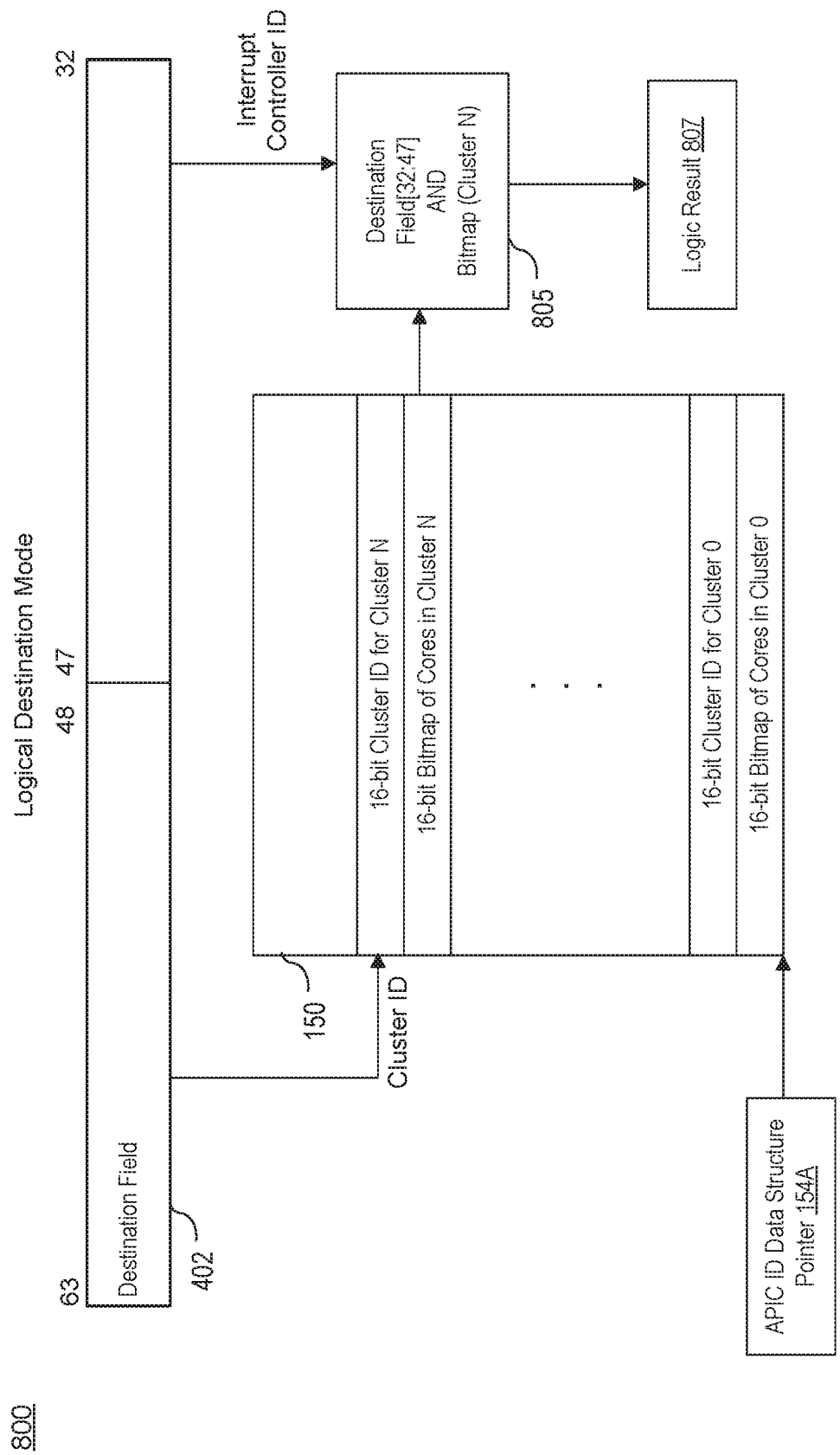
FIG. 8 is a logic flow diagram illustrating local APIC pass-through logic for a logical destination mode according to one implementation.

FIG. 8 is a logic flow diagram 800 illustrating local APIC pass-through logic (e.g., of the interrupt controller logic 108 of the local APIC 106A) for a logical destination mode according to one implementation. In another implementation of the APIC pass-through logic, the value within the destination field 402 of the ICR 136 includes values for the interrupt controller ID in bits [47:32] and for the cluster ID in bits [63:48], and no conversion is necessary. Accordingly, the cluster ID and the interrupt controller ID associated with destination cores may be read directly from the destination field 402, as illustrated.

In various implementations, the APIC ID data structure pointer 154A within the VMCS may then be used to link to the correct data structure 150 in memory, and from there to the correct cluster information corresponding to the cluster ID obtained from the destination field 402. The bitmap for the cores of the subset of the multiple cores may then be read out of the data structure 150 (e.g., the bitmap associated with that cluster ID) and compared with the interrupt controller ID via a bitwise AND operation 805 to generate a logic result 807. If the logic result 807 is true (e.g., a non-zero value), then the IPI message with the information from the ICR is sent onto the system bus 115. If, however, the logic result 807 is false (e.g., a zero value), then the values written to the ICR are discarded and the IPI message is not sent onto the system bus 115.

Figure 9:
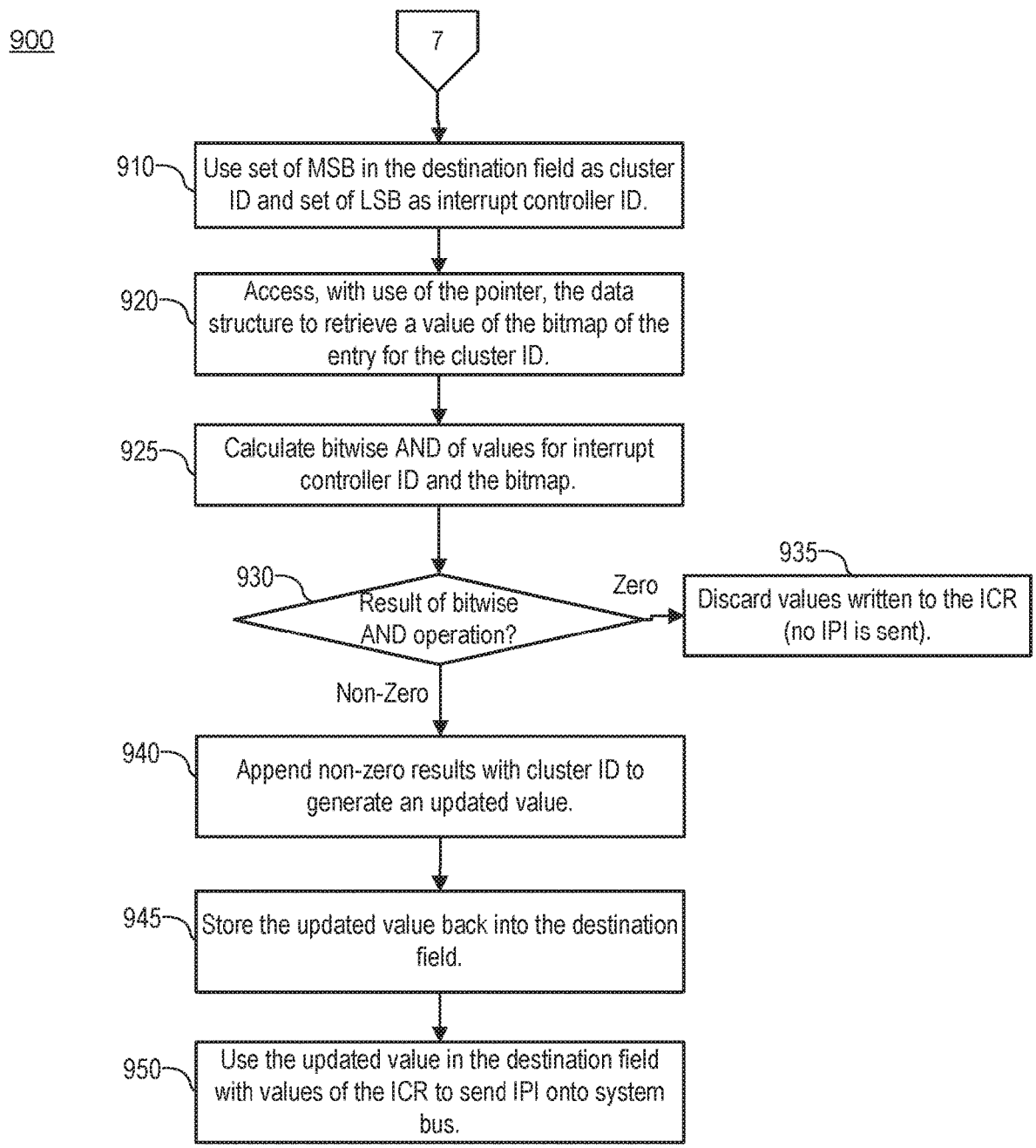
FIG. 9 is a flow chart of a method for implementing local APIC pass-through logic for the logical destination mode according to one implementation.

FIG. 9 is a flow chart of a method 900 for implementing local APIC pass-through logic for the logical destination mode according to one implementation. The method 900 may be performed by processing logic that may comprise hardware (e.g., circuitry, dedicated logic, programmable logic, microcode, etc.), firmware, or a combination thereof. In one implementation, the method 900 is performed by the APIC logic 106A, or more particularly, by the interrupt controller logic 108 with reference to the values in one or more of the registers 130. The method 900 may be a continuation from block 735B in FIG. 7, where the processing logic determines that the destination more id logical.

With reference to FIG. 9, the method 900 may begin with the processing logic using a set of most significant bits (MSB) in the destination field as the cluster ID of a cluster and a set of least significant bits (LSB) of the destination field as an interrupt controller identifier (ID) within the cluster of the one or more clusters (910). The method 900 may continue with the processing logic accessing, with use of the pointer, the data structure to retrieve a value of the bitmap of the entry corresponding to the cluster identifier (920). The method 900 may continue with the processing logic calculating a bitwise AND of the values for the interrupt controller ID and the bitmap of the entry (925).

In various implementations, the method 900 continues with the processing logic determining the result of the bitwise AND operation (930). If the result is a zero value, the method 900 may continue with the processing logic discarding the values written to the ICR, and thus no IPI is sent onto the system bus (935). If the result is non-zero, the method 900 may continue with the processing logic appending non-zero results of the bitwise AND with the cluster identifier to generate an updated value for the destination field (940). The method 900 may continue with the processing logic storing the updated value back into the destination field (945). The method 900 may continue with the processing logic using the updated value in the destination field with values of the ICR to send the IPI onto the system bus (950). The IPI may be sent by sending the values in the ICR as a package onto the system bus 115 directed to the destination core.

Figure 10:
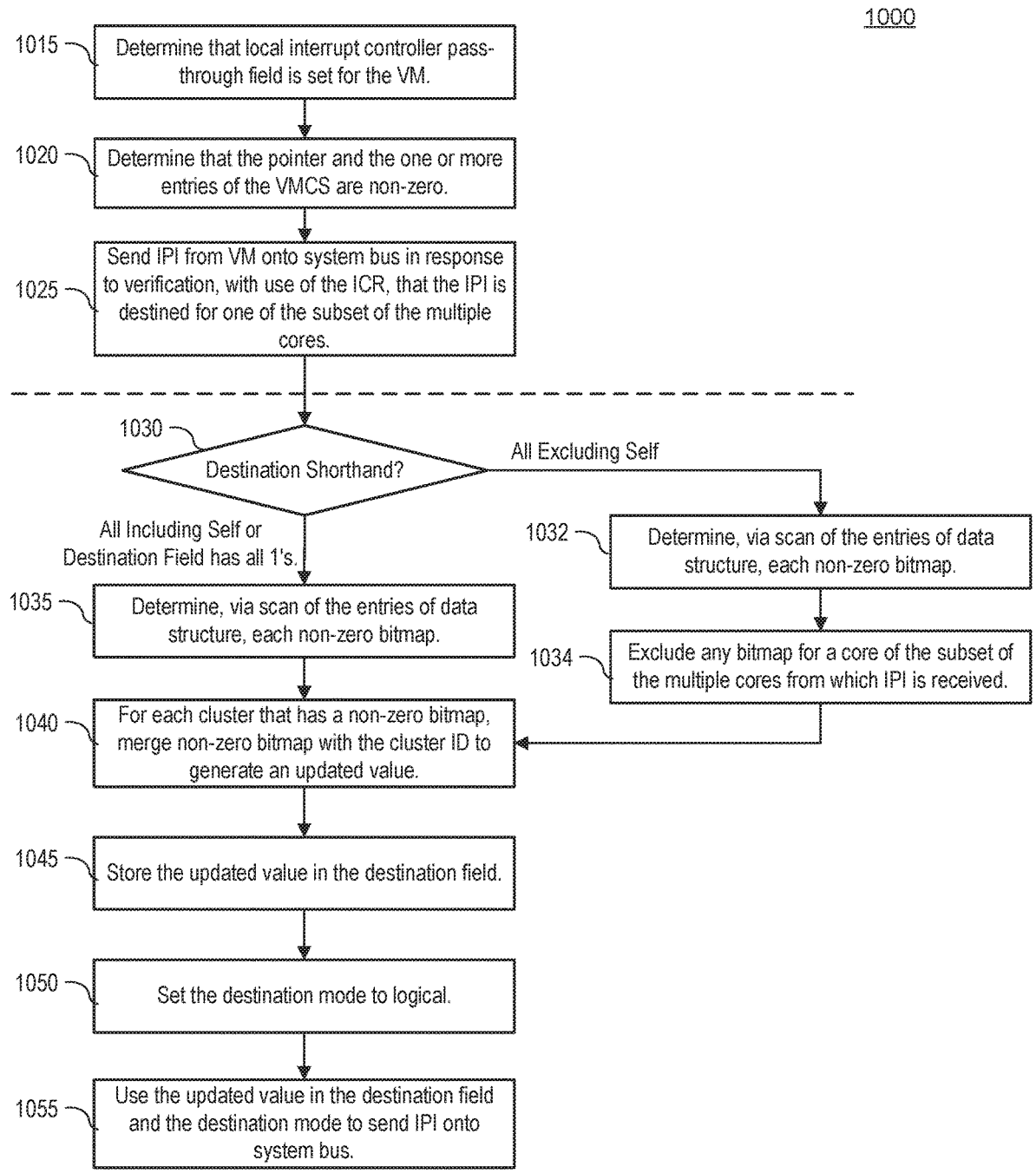
FIG. 10 is a flow chart of a method for implementing local APIC pass-through logic for a destination shorthand according to one implementation.

FIG. 10 is a flow chart of a method 1000 for implementing local APIC pass-through logic for a destination shorthand according to one implementation. The method 1000 may be performed by processing logic that may comprise hardware (e.g., circuitry, dedicated logic, programmable logic, microcode, etc.), firmware, or a combination thereof. In one implementation, the method 1000 is performed by the APIC logic 106A, or more particularly, by the interrupt controller logic 108 with reference to the values in one or more of the registers 130.

With reference to FIG. 10, the method 1000 may begin with determining that the local interrupt controller pass-through field is set for the VM (1015). The method 1000 may continue with the processing logic determining that the pointer (e.g., APIC ID data structure pointer 154A) and the number of the one or more entries (e.g., number of APIC ID entries 156A) of the virtual machine control structure (VMCS) are non-zero (1020). The method 1000 may continue with the processing logic sending the IPI onto the system bus that couples the multiple cores in response to verification, with use of the ICR, that the IPI is destined for one of the subset of the multiple cores (1025).

With continued reference to FIG. 7, the verification just mentioned may be performed with the additional steps below the dashed line. The method 1000 may continue with the processing logic determining which destination shorthand has been set (1030). If the "all excluding self" destination shorthand is set, the method 1000 may continue with the processing logic determining, via scan of the entries of the data structure, each non-zero bitmap (1032). The method 1000 may continue with the processing logic excluding any bitmap for a core of the subset of the multiple cores from which the IPI is received before continuing with block 1040 of the method 1000 (1034).

If the "all including self" destination short is set or the destination field has all one values (e.g., 0×FFFFFFFFH), the method 1000 may continue with the processing logic determining, via a scan of the one or more entries of the data structure, each non-zero bitmap of the one or more entries, e.g., without the exclusion of block 1034 (1035). The method 1000 may continue with the processing logic, for a cluster that has a non-zero bitmap, merging the non-zero bitmap with the cluster identifier of the cluster to generate an updated value (1040). The method 1000 may continue with the processing logic storing the updated value in the destination field (1045). The method 1000 may continue with the processing logic setting the destination mode to logical (1050). The method 1000 may continue with the processing logic using the updated value in the destination field and the destination mode to send the IPI onto the system bus coupled to the plurality of cores (1055).

FIG. 11A is a block diagram illustrating a micro-architecture for a processor 1100 that implements IPI virtualization with pass-through of local interrupt controller. Specifically, processor 1100 depicts an in-order architecture core and a register renaming logic, out-of-order issue/execution logic to be included in a processor according to at least one implementation of the disclosure.

Processor 1100 includes a front end unit 1130 coupled to an execution engine unit 1150, and both are coupled to a memory unit 1170. The processor 1100 may include a reduced instruction set computing (RISC) core, a complex instruction set computing (CISC) core, a very long instruction word (VLIW) core, or a hybrid or alternative core type. As yet another option, processor 1100 may include a special-purpose core, such as, for example, a network or communication core, compression engine, graphics core, or the like. In one implementation, processor 1100 may be a multi-core processor or may be part of a multi-processor system.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1140 may be implemented using various different mechanisms. Examples of suitable mechanisms include, but are not limited to, look-up tables, hardware implementations, programmable logic arrays (PLAs), microcode read only memories (ROMs), etc. The instruction cache unit 1134 is further coupled to the memory unit 1170. The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different scheduler circuits, including reservations stations (RS), central instruction window, etc. The scheduler unit(s) 1156 is coupled to the physical register set(s) unit(s) 1158. Each of the physical register set(s) units 1158 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 1158 is overlapped by the retirement unit 1154 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1154 and the physical register set(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 1156, physical register set(s) unit(s) 1158, and execution cluster(s) 1160 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which may include a data prefetcher 1180, a data TLB unit 1172, a data cache unit (DCU) 1174, and a level 2 (L2) cache unit 1176, to name a few examples. In some implementations DCU 1174 is also known as a first level data cache (L1 cache). The DCU 1174 may handle multiple outstanding cache misses and continue to service incoming stores and loads. It also supports maintaining cache coherency. The data TLB unit 1172 is a cache used to improve virtual address translation speed by mapping virtual and physical address spaces. In one exemplary implementation, the memory access units 1164 may include a load unit, a store address unit, and a store data unit, each of which is coupled to the data TLB unit 1172 in the memory unit 1170. The L2 cache unit 1176 may be coupled to one or more other levels of cache and eventually to a main memory.

In one implementation, the data prefetcher 1180 speculatively loads/prefetches data to the DCU 1174 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1100 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 11B is a block diagram illustrating an in-order pipeline and a register renaming stage, out-of-order issue/execution pipeline implemented by processor 1100 of FIG. 11A according to some implementations of the disclosure. The solid lined boxes in FIG. 11B illustrate an in-order pipeline 1101, while the dashed lined boxes illustrate a register renaming, out-of-order issue/execution pipeline 1103. In FIG. 11B, the pipelines 1101 and 1103 include a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1120, and a commit stage 1122. In some implementations, the ordering of stages 1102-1124 may be different than illustrated and are not limited to the specific ordering shown in FIG. 11B.

Figure 12:
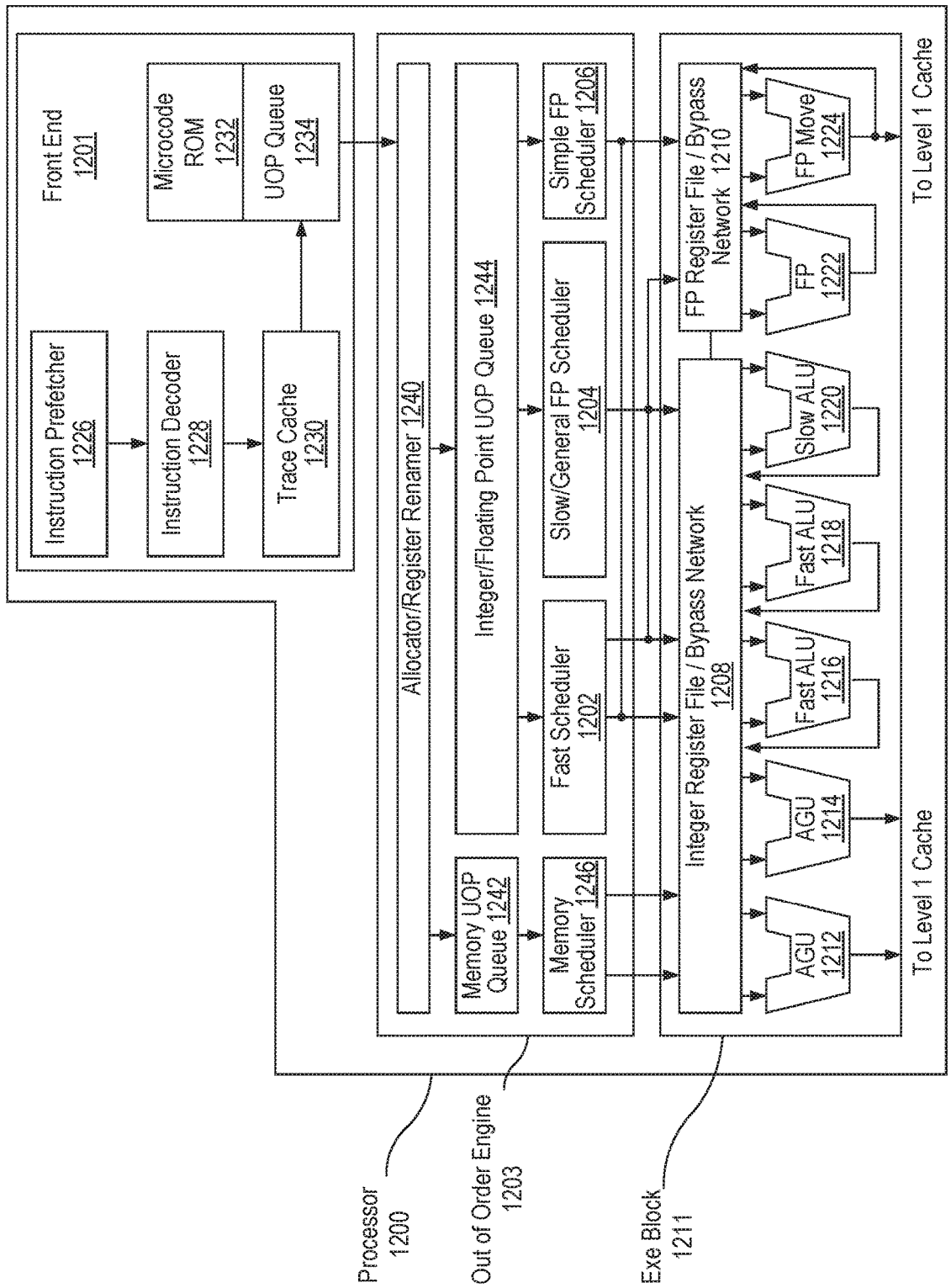
FIG. 12 illustrates a block diagram of the micro-architecture for a processing device that includes logic circuits to provide IPI virtualization with pass-through of local interrupt controller according to one implementation.

FIG. 12 illustrates a block diagram of the micro-architecture for a processor 1200 that includes logic circuits of a processor or an integrated circuit that implements hardware support for IPI virtualization with pass-through of local interrupt controller, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 1201 is the part of the processor 1200 that fetches instructions to be executed and prepares them to be used later in the processor pipeline.

The implementations of the page additions and content copying can be implemented in processor 1200.

The front end 1201 may include several units. In one implementation, the instruction prefetcher 1226 fetches instructions from memory and feeds them to an instruction decoder 1228 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 1230 takes decoded uops and assembles them into program ordered sequences or traces in the uop queue 1234 for execution. When the trace cache 1230 encounters a complex instruction, microcode ROM (or RAM) 1232 provides the uops needed to complete the operation.

Some instructions are converted into a single micro-op, whereas others need several micro-ops to complete the full operation. In one implementation, if more than four micro-ops are needed to complete an instruction, the instruction decoder 1228 accesses the microcode ROM 1232 to do the instruction. For one implementation, an instruction can be decoded into a small number of micro ops for processing at the instruction decoder 1228. In another implementation, an instruction can be stored within the microcode ROM 1232 should a number of micro-ops be needed to accomplish the operation. The trace cache 1230 refers to an entry point programmable logic array (PLA) to determine a correct micro-instruction pointer for reading the micro-code sequences to complete one or more instructions in accordance with one implementation from the micro-code ROM 1232. After the microcode ROM 1232 finishes sequencing micro-ops for an instruction, the front end 1201 of the machine resumes fetching micro-ops from the trace cache 1230.

The out-of-order execution engine 1203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1202, slow/general floating point scheduler 1204, and simple floating point scheduler 1206. The uop schedulers 1202, 1204, 1206, determine when a uop is ready to execute based on the readiness of their dependent input register operand sources and the availability of the execution resources the uops need to complete their operation. The fast scheduler 1202 of one implementation can schedule on each half of the main clock cycle while the other schedulers can only schedule once per main processor clock cycle. The schedulers arbitrate for the dispatch ports to schedule uops for execution.

Register sets 1208, 1210, sit between the schedulers 1202, 1204, 1206, and the execution units 1212, 1214, 1216, 1218, 1220, 1222, 1224 in the execution block 1211. There is a separate register set 1208, 1210, for integer and floating point operations, respectively. Each register set 1208, 1210, of one implementation also includes a bypass network that can bypass or forward just completed results that have not yet been written into the register set to new dependent uops. The integer register set 1208 and the floating point register set 1210 are also capable of communicating data with the other. For one implementation, the integer register set 1208 is split into two separate register sets, one register set for the low order 32 bits of data and a second register set for the high order 32 bits of data. The floating point register set 1210 of one implementation has 128 bit wide entries because floating point instructions typically have operands from 64 to 128 bits in width.

The execution block 1211 contains the execution units 1212, 1214, 1216, 1218, 1220, 1222, 1224, where the instructions are actually executed. This section includes the register sets 1208, 1210, that store the integer and floating point data operand values that the micro-instructions need to execute. The processor 1200 of one implementation is comprised of a number of execution units: address generation unit (AGU) 1212, AGU 1214, fast ALU 1216, fast ALU 1218, slow ALU 1220, floating point ALU 1212, floating point move unit 1214. For one implementation, the floating point execution blocks 1212, 1214, execute floating point, MMX, SIMD, and SSE, or other operations. The floating point ALU 1212 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 1216, 1218. The fast ALUs 1216, 1218, of one implementation can execute fast operations with an effective latency of half a clock cycle. For one implementation, most complex integer operations go to the slow ALU 1220 as the slow ALU 1220 includes integer execution hardware for long latency type of operations, such as a multiplier, shifts, flag logic, and branch processing. Memory load/store operations are executed by the AGUs 1222, 1224. For one implementation, the integer ALUs 1216, 1218, 1220, are described in the context of performing integer operations on 64 bit data operands. In alternative implementations, the ALUs 1216, 1218, 1220, can be implemented to support a variety of data bits including 16, 32, 128, 256, etc. Similarly, the floating point units 1222, 1224, can be implemented to support a range of operands having bits of various widths. For one implementation, the floating point units 1222, 1224, can operate on 128 bits wide packed data operands in conjunction with SIMD and multimedia instructions.

In one implementation, the uops schedulers 1202, 1204, 1206, dispatch dependent operations before the parent load has finished executing. As uops are speculatively scheduled and executed in processor 1200, the processor 1200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 13:
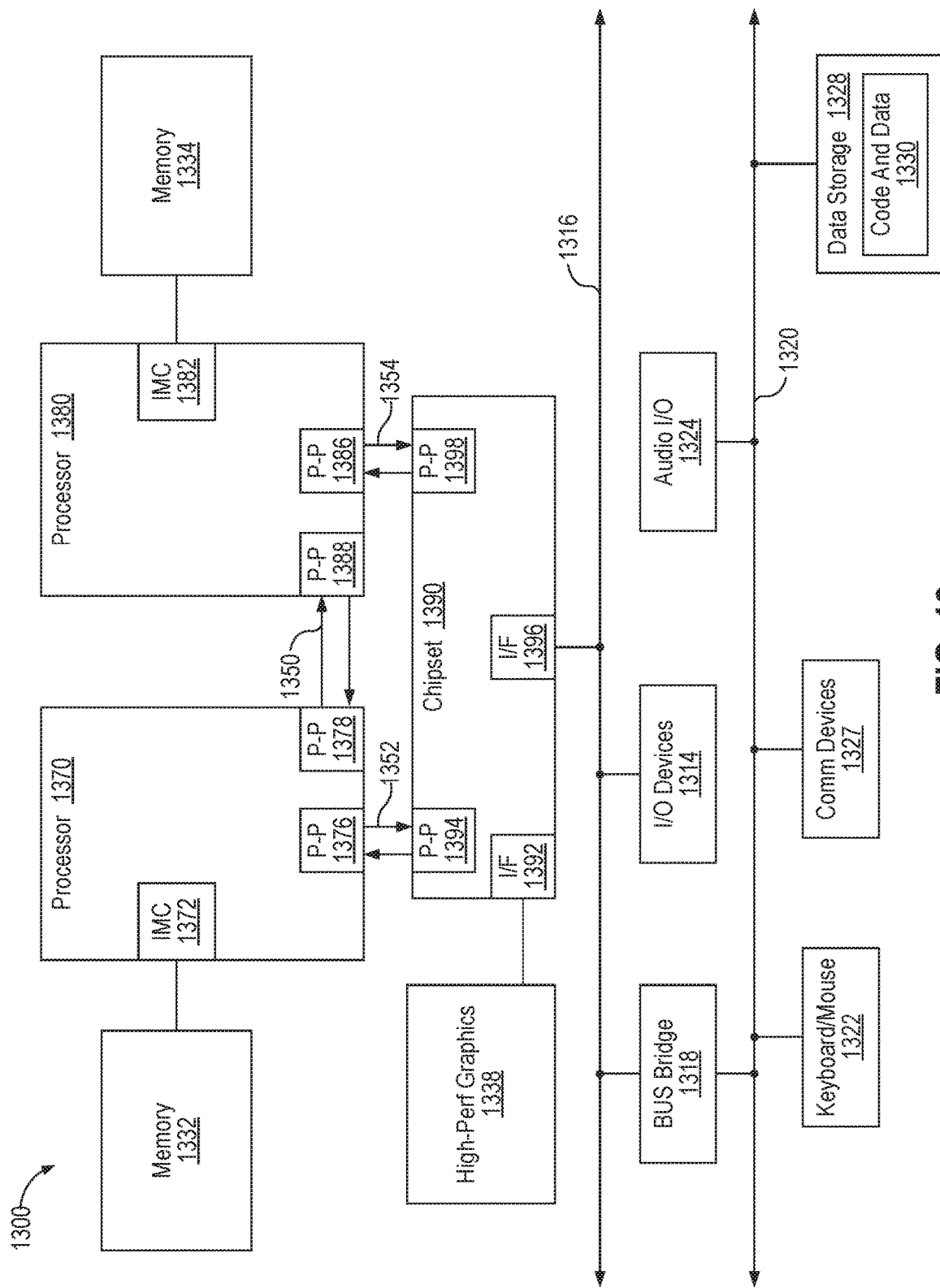
FIG. 13 is a block diagram of a computer system according to one implementation.

Implementations may be implemented in many different system types. Referring now to FIG. 13, shown is a block diagram of a multiprocessor system 1300 that may implement hardware support for IPI virtualization with pass-through of local interrupt controller, in accordance with an implementation. As shown in FIG. 13, multiprocessor system 1300 is a point-to-point interconnect system, and includes a first processor 1370 and a second processor 1380 coupled via a point-to-point interconnect 1350. As shown in FIG. 13, each of processors 1370 and 1380 may be multicore processors, including first and second processor cores (i.e., processor cores 1374*a* and 1374*b* and processor cores 1384*a* and 1384*b*), although potentially many more cores may be present in the processors. While shown with two processors 1370, 1380, it is to be understood that the scope of the disclosure is not so limited. In other implementations, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may exchange information with a chipset 1390 via individual P-P interfaces 1352, 1354 using point to point interface circuits 1376, 1394, 1386, 1398. Chipset 1390 may also exchange information with a high-performance graphics circuit 1338 via a high-performance graphics interface 1392.

Chipset 1390 may be coupled to a first bus 1316 via an interface 1396. In one implementation, first bus 1316 may be a Peripheral Component Interconnect (PCI) bus, or a bus such as a PCI Express bus or interconnect bus, although the scope of the disclosure is not so limited.

As shown in FIG. 13, various I/O devices 1314 may be coupled to first bus 1316, along with a bus bridge 1318 which couples first bus 1316 to a second bus 1320. In one implementation, second bus 1320 may be a low pin count (LPC) bus. Various devices may be coupled to second bus 1320 including, for example, a keyboard and/or mouse 1322, communication devices 1327 and a storage unit 1328 such as a disk drive or other mass storage device which may include instructions/code and data 1330, in one implementation. Further, an audio I/O 1324 may be coupled to second bus 1320. Note that other architectures are possible. For example, instead of the point-to-point architecture of FIG. 13, a system may implement a multi-drop bus or other such architecture.

Figure 14:
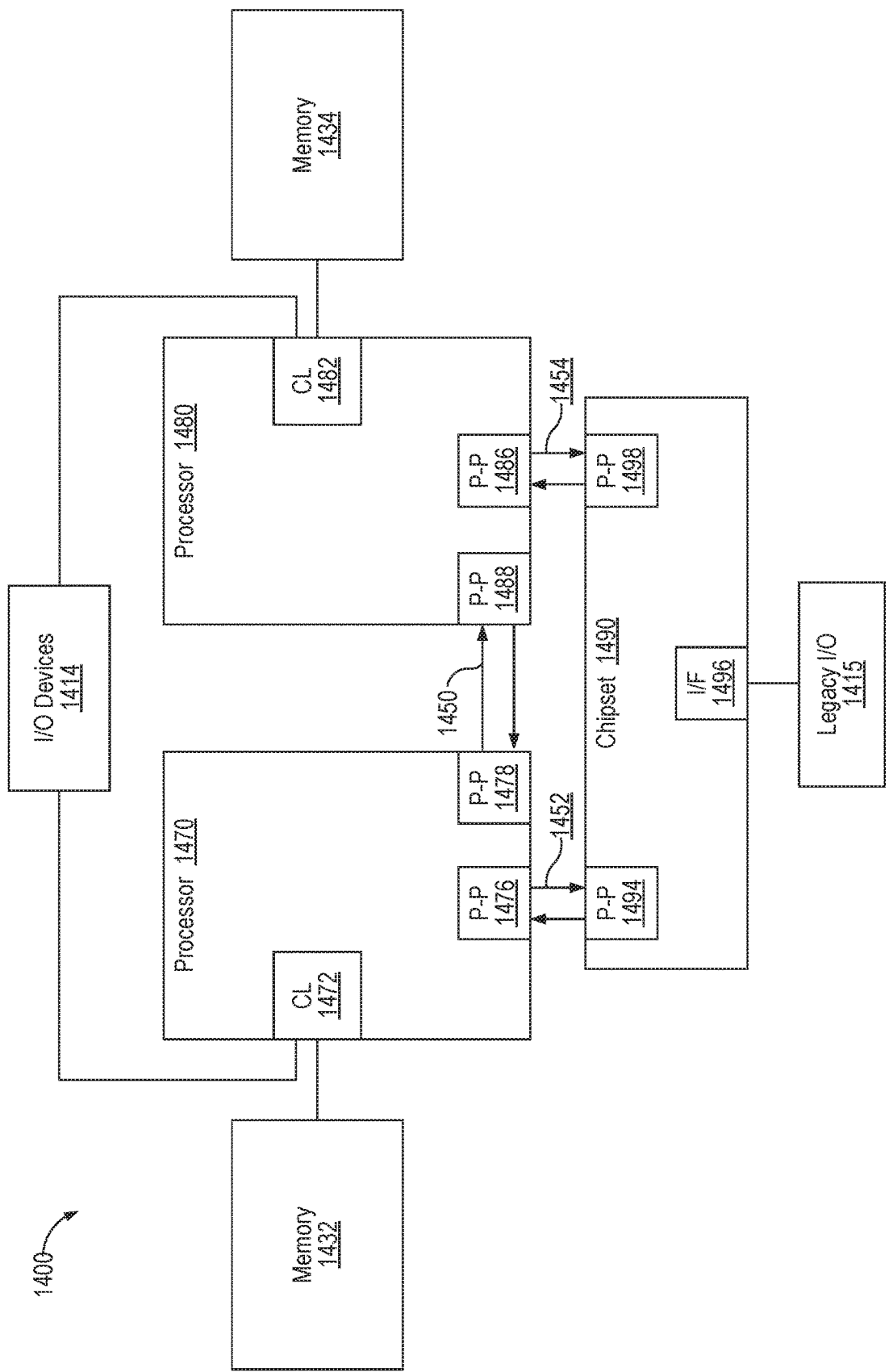
FIG. 14 is a block diagram of a computer system according to another implementation.

Referring now to FIG. 14, shown is a block diagram of a third system 1400 that may implement hardware support for IPI virtualization with pass-through of local interrupt controller, in accordance with an implementation of the disclosure. Like elements in FIGS. 13 and 14 bear like reference numerals and certain aspects of FIG. 14 have been omitted from FIG. 13 in order to avoid obscuring other aspects of FIG. 13.

FIG. 14 illustrates processors 1470, 1480. In one implementation, processors 970, 980 may implement hybrid cores as described above. Processors 1470, 1480 may include integrated memory and I/O control logic ("CL") 1472 and 1492, respectively and intercommunicate with each other via point-to-point interconnect 1450 between point-to-point (P-P) interfaces 1478 and 1488 respectively. Processors 1470, 1480 each communicate with chipset 1490 via point-to-point interconnects 1452 and 1454 through the respective P-P interfaces 1476 to 1494 and 1486 to 1498 as shown. For at least one implementation, the CL 1472, 1482 may include integrated memory controller units such as described herein. In addition. CL 1472, 1492 may also include I/O control logic. FIG. 14 illustrates that the memories 1432, 1434 are coupled to the CL 1472, 1492, and that I/O devices 1414 are also coupled to the control logic 1472, 1492. Legacy I/O devices 1415 are coupled to the chipset 1490 via interface 1496.

Figure 15:
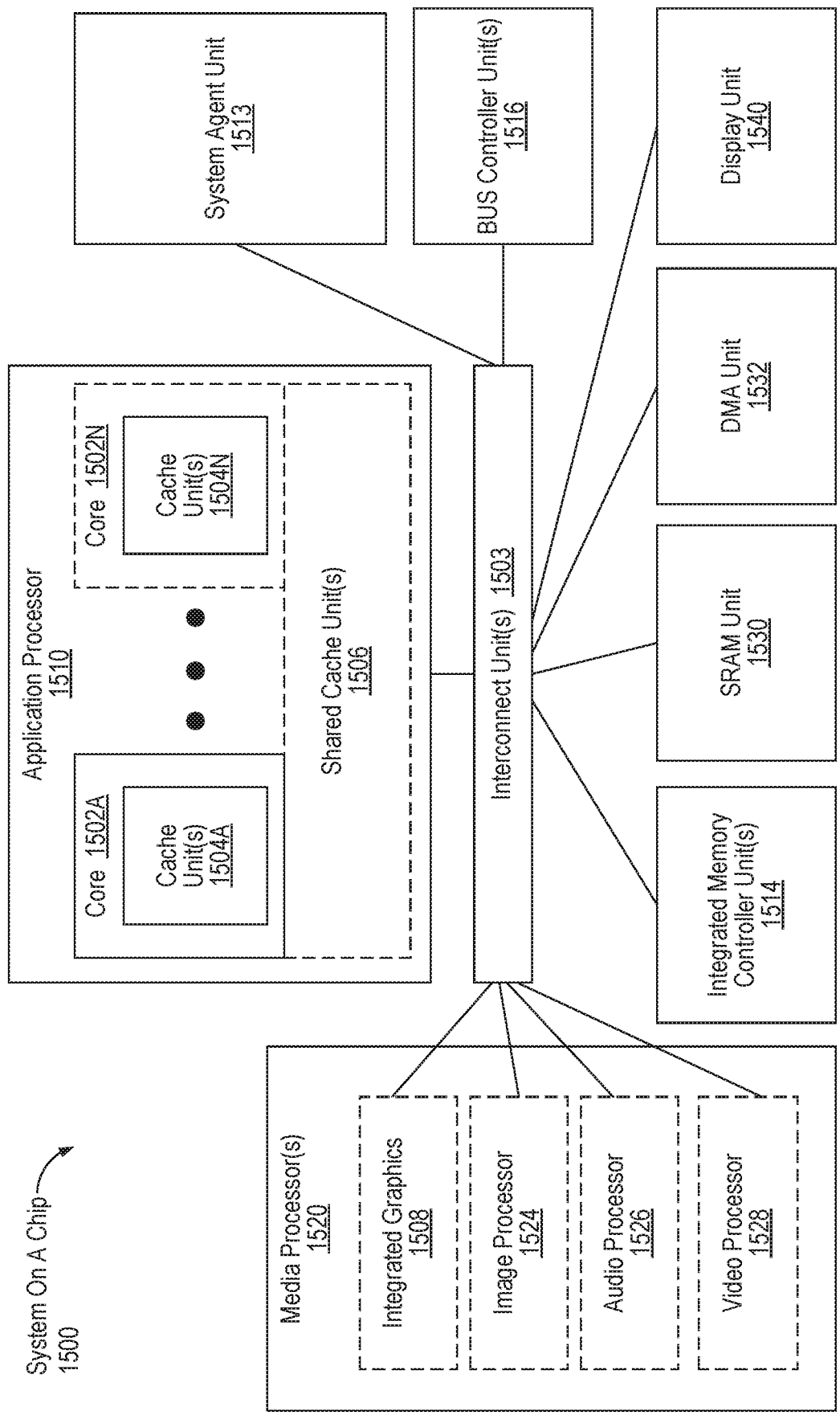
FIG. 15 is a block diagram of a system-on-a-chip according to one implementation.

FIG. 15 is an exemplary system on a chip (SoC) 1500 that may include one or more of the cores 1502A . . . 1502N that may implement hardware support for IPI virtualization with pass-through of local interrupt controller. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1500 of FIG. 15, dashed lined boxes are features on more advanced SoCs. An interconnect unit(s) 1503 may be coupled to: an application processor 1517 which includes a set of one or more cores 1502A-N, containing one or more cache unit(s) 1504A . . . 1504N, respectively, and shared cache unit(s) 1506; a system agent unit 1513; an integrated memory controller unit(s) 1514; a bus controller unit(s) 1516; a set of one or more media processors 1520 which may include integrated graphics logic 1508, an image processor 1524 for providing still and/or video camera functionality, an audio processor 1526 for providing hardware audio acceleration, and a video processor 1528 for providing video encode/decode acceleration; a static random access memory (SRAM) unit 1530; a direct memory access (DMA) unit 1532; and a display unit 1540 for coupling to one or more external displays.

Figure 16:
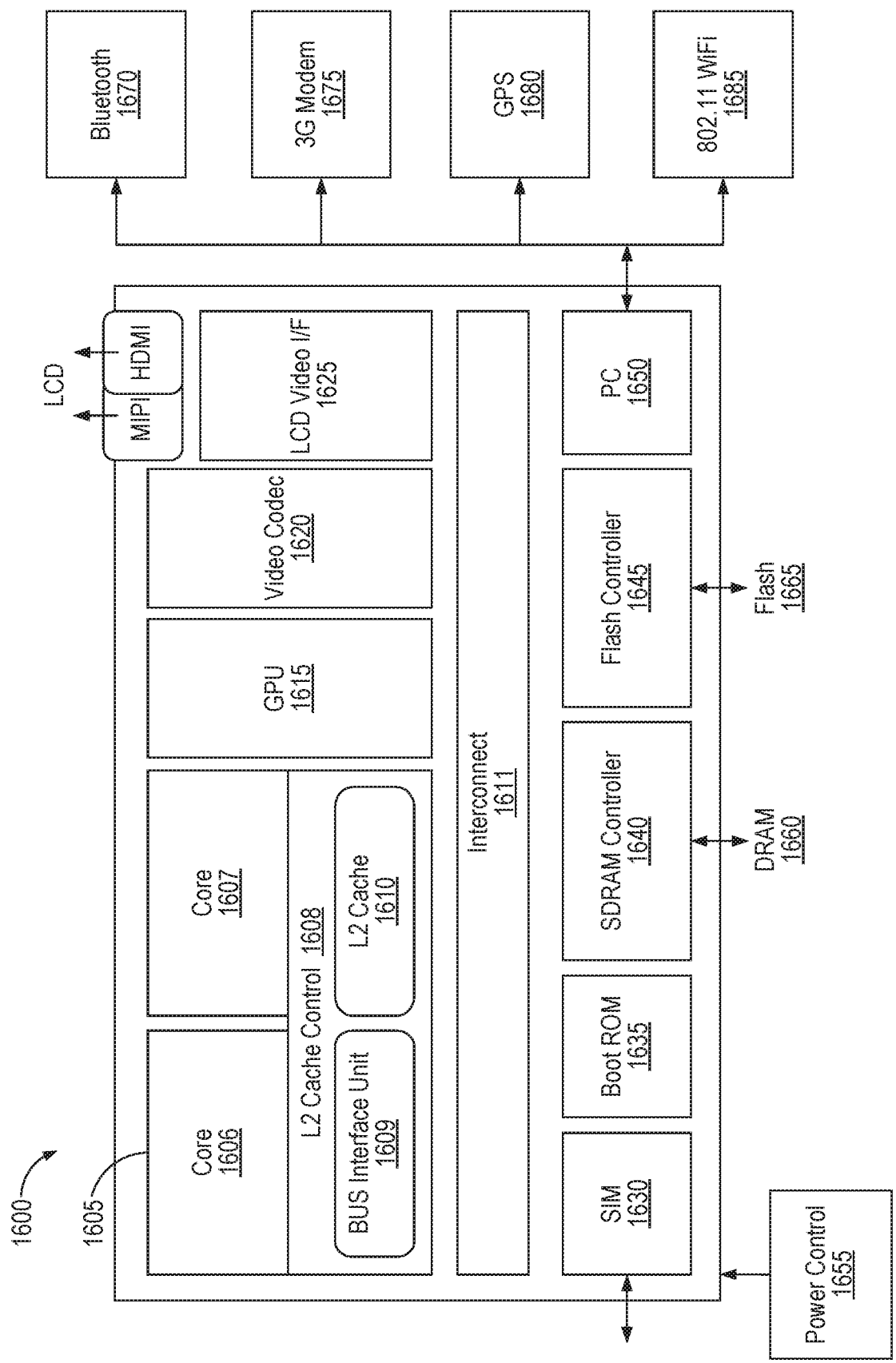
FIG. 16 illustrates another implementation of a block diagram for a computing system.

Turning next to FIG. 16, an implementation of a system on-chip (SoC) design that may implement hardware support for IPI virtualization with pass-through of local interrupt controller, in accordance with implementations of the disclosure is depicted. As an illustrative example, SoC 1600 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1600.

Here, SoC 1600 includes 2 cores—1606 and 1607. Similar to the discussion above, cores 1606 and 1607 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1606 and 1607 are coupled to cache control 1608 that is associated with bus interface unit 1609 and L2 cache 1610 to communicate with other parts of system 1600. Interconnect 1611 includes an on-chip interconnect, such as an IOSF, AMBA, or other interconnects discussed above, which can implement one or more aspects of the described disclosure.

In one implementation, SDRAM controller 1640 may connect to interconnect 1611 via cache 1610. Interconnect 1611 provides communication channels to the other components, such as a Subscriber Identity Module (SIM) 1630 to interface with a SIM card, a boot ROM 1635 to hold boot code for execution by cores 1606 and 1607 to initialize and boot SoC 1600, a SDRAM controller 1640 to interface with external memory (e.g. DRAM 1660), a flash controller 1645 to interface with non-volatile memory (e.g. Flash 1665), a peripheral control 1650 (e.g. Serial Peripheral Interface) to interface with peripherals, video codecs 1620 and Video interface 1625 to display and receive input (e.g. touch enabled input), GPU 1615 to perform graphics related computations, etc. Any of these interfaces may incorporate aspects of the implementations described herein.

In addition, the system illustrates peripherals for communication, such as a power control module 1655, a Bluetooth® module 1670, 3G modem 1675, GPS 1680, and Wi-Fi® 1685. Note as stated above, a UE includes a radio for communication. As a result, these peripheral communication modules may not all be included. However, in a UE some form of a radio for external communication should be included.

Figure 17:
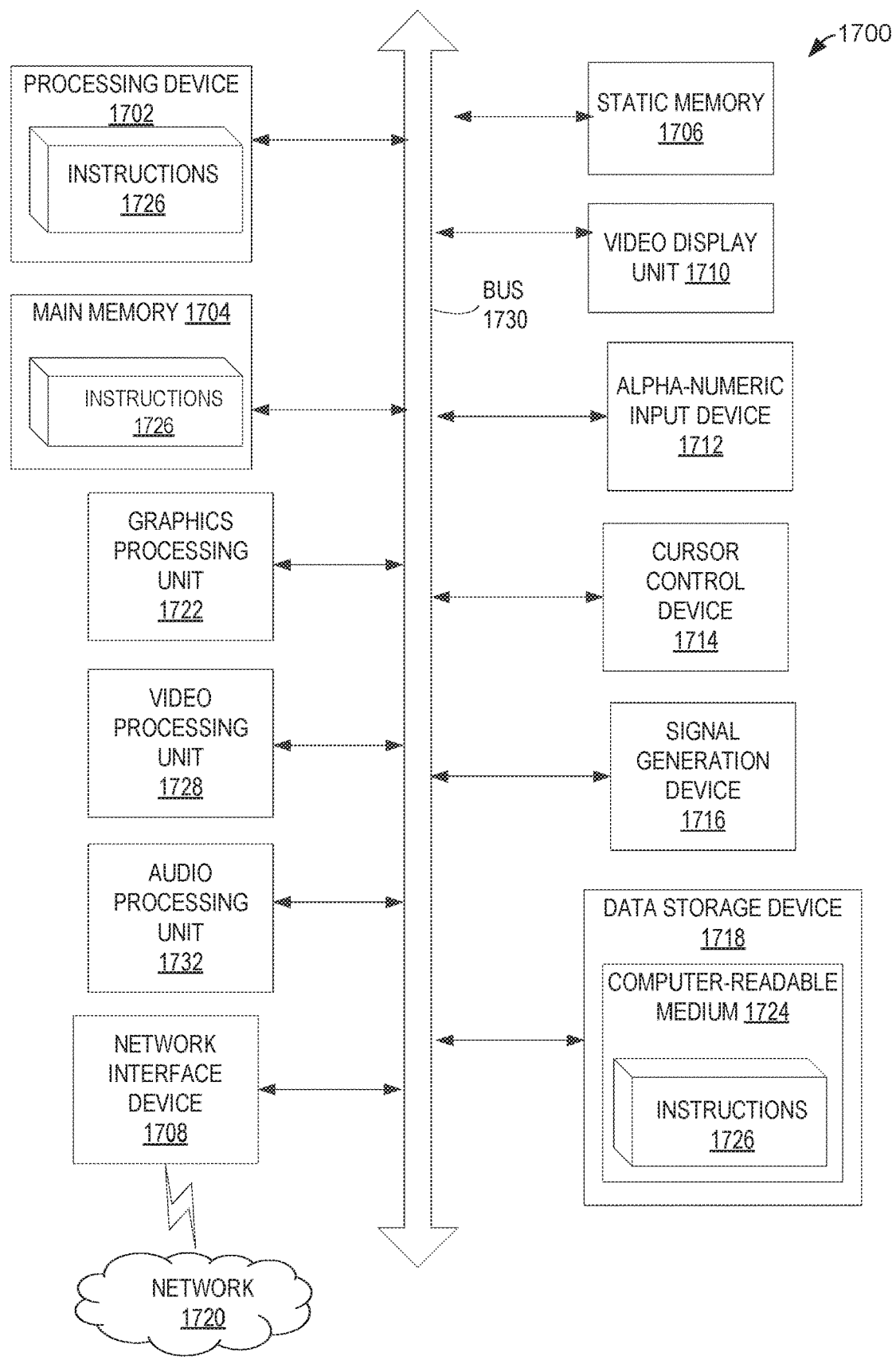
FIG. 17 illustrates another implementation of a block diagram for a computing system.

FIG. 17 illustrates a diagrammatic representation of a machine in the example form of a computing system 1700 within which a set of instructions, for causing the machine to implement hardware support for IPI virtualization with pass-through of local interrupt controller according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1700.

The computing system 1700 includes a processing device 1702, main memory 1704 (e.g., flash memory, dynamic random access memory (DRAM) (such as synchronous DRAM (SDRAM) or DRAM (RDRAM), etc.), a static memory 1706 (e.g., flash memory, static random access memory (SRAM), etc.), and a data storage device 1716, which communicate with each other via a bus 1708.

Processing device 1702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1702 may also be one or more special-purpose processing devices such as an application-specific integrated circuit (ASIC), a field programmable gate array (FPGA), a digital signal processor (DSP), network processor, or the like. In one implementation, processing device 1702 may include one or more processor cores. The processing device 1702 is configured to execute the processing logic 1726 for performing the operations discussed herein.

In one implementation, processing device 1702 can be part of a processor or an integrated circuit that includes the disclosed LLC caching architecture. Alternatively, the computing system 1700 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1700 may further include a network interface device 1718 communicably coupled to a network 1719. The computing system 1700 also may include a video display device 1710 (e.g., a liquid crystal display (LCD) or a cathode ray tube (CRT)), an alphanumeric input device 1712 (e.g., a keyboard), a cursor control device 1714 (e.g., a mouse), a signal generation device 1720 (e.g., a speaker), or other peripheral devices. Furthermore, computing system 1700 may include a graphics processing unit 1722, a video processing unit 1728 and an audio processing unit 1732. In another implementation, the computing system 1700 may include a chipset (not illustrated), which refers to a group of integrated circuits, or chips, that are designed to work with the processing device 1702 and controls communications between the processing device 1702 and external devices. For example, the chipset may be a set of chips on a motherboard that links the processing device 1702 to very high-speed devices, such as main memory 1704 and graphic controllers, as well as linking the processing device 1702 to lower-speed peripheral buses of peripherals, such as USB, PCI or ISA buses.

The data storage device 1716 may include a computer-readable storage medium 1724 on which is stored software 1726 embodying any one or more of the methodologies of functions described herein. The software 1726 may also reside, completely or at least partially, within the main memory 1704 as instructions 1726 and/or within the processing device 1702 as processing logic during execution thereof by the computing system 1700; the main memory 1704 and the processing device 1702 also constituting computer-readable storage media.

The computer-readable storage medium 1724 may also be used to store instructions 1726 utilizing the processing device 1702, and/or a software library containing methods that call the above applications. While the computer-readable storage medium 1724 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is a processor comprising: 1) a plurality of cores, wherein at least one of the plurality of cores is to execute a virtual machine monitor (VMM), and wherein to configure resources for a virtual machine (VM), the VMM is to: a) group the plurality of cores into one or more clusters, wherein a subset of the plurality of cores is to execute the VM; b) create, within a buffer in memory, a data structure to store, for the subset of the plurality of cores, one or more entries, each entry of the one or more entries comprising a cluster identifier and a bitmap, wherein the bitmap identifies cores of the subset within a cluster corresponding to the cluster identifier; c) write, to a virtual machine control structure of the memory: i) a pointer to the data structure, wherein the pointer comprises a physical address of the memory; and ii) a number of the one or more entries in the data structure; and d) set, within the virtual machine control structure, a local interrupt controller pass-through field.

In Example 2, the processor of Example 1, further comprising an interrupt command register (ICR), wherein a guest operating system (OS) of the VM is to write values to the ICR to send an inter-processor interrupt (IPI), the values to populate: i) a destination field that identifies one or more destination cores of the plurality of cores; and ii) a destination mode comprising one of physical or logical.

In Example 3, the processor of Example 2, further comprising a programmable interrupt controller to: a) convert a value in the destination field into values for the cluster identifier of a cluster and an interrupt controller identifier (ID) within the cluster of the one or more clusters; b) access, with use of the pointer, the data structure to retrieve a value of the bitmap of the entry corresponding to the cluster identifier; c) calculate a bitwise AND of the values for the interrupt controller ID and the bitmap of the entry; and d) discard the values written to the ICR in response to the bitwise AND resulting in a zero value.

In Example 4, the processor of claim 2, further comprising a programmable interrupt controller to: a) determine that the local interrupt controller pass-through field is set for the VM; b) determine that the pointer and the number of the one or more entries of the virtual machine control structure are non-zero; and c) send the IPI onto a system bus that couples the plurality of cores in response to verification, with use of the ICR, that the IPI is destined for one of the subset of the plurality of cores.

In Example 5, the processor of Example 4, wherein, to determine the IPI is destined for one of the subset of the plurality of cores, the programmable interrupt controller is further to: a) determine that the destination mode is physical; b) convert a value in the destination field into values for the cluster identifier of a cluster and an interrupt controller identifier (ID) within the cluster of the one or more clusters; c) access, with use of the pointer, the data structure to retrieve a value of the bitmap of the entry corresponding to the cluster identifier; d) calculate a bitwise AND of the values for the interrupt controller ID and the bitmap of the entry; and e) determine that the interrupt controller ID is associated with one of the cores of the subset of the plurality of cores in response to the bitwise AND resulting in a non-zero value.

In Example 6, the processor of Example 4, wherein, to determine the IPI is destined for one of the subset of the plurality of cores, the programmable interrupt controller is further to: a) determine that the destination mode is logical; b) use a plurality of most significant bits in the destination field as the cluster identifier of a cluster and a plurality of least significant bits of the destination field as an interrupt controller identifier (ID) within the cluster of the one or more clusters; c) access, with use of the pointer, the data structure to retrieve a value of the bitmap of the entry corresponding to the cluster identifier; d) calculate a bitwise AND of the values for the interrupt controller ID and the bitmap of the entry; e) append non-zero results of the bitwise AND with the cluster identifier to generate an updated value for the destination field; f) store the updated value back into the destination field; and e) use the updated value in the destination field with values of the ICR to send the IPI onto the system bus.

In Example 7, the processor of Example 2, wherein the guest OS of the VM is further to write a value for a destination shorthand to the ICR, further comprising a programmable interrupt controller to: a) determine one of that the destination shorthand has been set to all including self or the destination field is programmed with all one values; b) determine, via a scan of the one or more entries of the data structure, each non-zero bitmap of the one or more entries; c) for a cluster that has a non-zero bitmap, merge the non-zero bitmap with the cluster identifier of the cluster to generate an updated value; d) store the updated value in the destination field; e) set the destination mode to logical; and f) use the updated value in the destination field and the destination mode to send the IPI onto a system bus coupled to the plurality of cores.

In Example 8, the processor of Example 2, wherein the guest OS of the VM is further to write a value for a destination shorthand to the ICR, further comprising a programmable interrupt controller to: a) determine that the destination shorthand has been set to all excluding self; b) determine, via a scan of the one or more entries of the data structure, each non-zero bitmap of the one or more entries, excluding any bitmap for a core of the subset of the plurality of cores from which the IPI is received; c) for a cluster that has a non-zero bitmap, merge the non-zero bitmap with the cluster identifier of the cluster to generate an updated value; d) store the updated value in the destination field; e) set the destination mode to logical; and f) use the updated value in the destination field and the destination mode to send the IPI onto a system bus coupled to the plurality of cores.

Various implementations may have different combinations of the structural features described above. For instance, all optional features of the processors and methods described above may also be implemented with respect to a system described herein and specifics in the examples may be used anywhere in one or more implementations.

Example 9 is a method comprising: a) grouping, by a virtual machine monitor (VMM) executing on at least one core of a plurality of cores, the plurality of cores into one or more clusters, wherein a subset of the plurality of cores is to execute a virtual machine (VM); b) creating, by the VMM within a buffer in memory, a data structure to store, for the subset of the plurality of cores, one or more entries, each entry of the one or more entries comprising a cluster identifier and a bitmap, wherein the bitmap identifies cores of the subset within a cluster corresponding to the cluster identifier; c) writing, by the VMM, to a virtual machine control structure of the memory: i) a pointer to the data structure, wherein the pointer comprises a physical address of the memory; and ii) a number of the one or more entries in the data structure; and d) setting, by the VMM within the virtual machine control structure, a local interrupt controller pass-through field.

In Example 10, the method of Example 9, further comprising writing, by a guest operating system (OS) of the VM, values to an interrupt control register (ICR) to send an inter-processor interrupt (IPI), the values to populate: i) a destination field that identifies one or more destination cores of the plurality of cores; and ii) a destination mode comprising one of physical or logical.

In Example 11, the method of Example 10, further comprising: a) reading a value in the destination field to determine the cluster identifier of a cluster and an interrupt controller identifier (ID) within the cluster of the one or more clusters; b) accessing, with use of the pointer, the data structure to retrieve a value of the bitmap of the entry corresponding to the cluster identifier; c) calculating a bitwise AND of the values for the interrupt controller ID and the bitmap of the entry; and d) discarding the values written to the ICR in response to the bitwise AND resulting in a zero value.

In Example 12, the method of Example 10, further comprising: a) determining that the local interrupt controller pass-through field is set for the VM; b) determining that the pointer and the number of the one or more entries of the virtual machine control structure are non-zero; and c) sending the IPI onto a system bus that couples the plurality of cores in response to verification, with use of the ICR, that the IPI is destined for one of the subset of the plurality of cores.

In Example 13, the method of Example 12, wherein, to determine the IPI is destined for one of the subset of the plurality of cores, the method further comprising: a) determining that the destination mode is physical; b) converting a value in the destination field into values for the cluster identifier of a cluster and an interrupt controller identifier (ID) within the cluster of the one or more clusters; c)

accessing, with use of the pointer, the data structure to retrieve a value of the bitmap of the entry corresponding to the cluster identifier; d) calculating a bitwise AND of the values for the interrupt controller ID and the bitmap of the entry; and e) determining that the interrupt controller ID is associated with one of the cores of the subset of the plurality of cores in response to the bitwise AND resulting in a non-zero value.

In Example 14, the method of Example 12, wherein, to determine the IPI is destined for one of the subset of the plurality of cores, the method further comprising: a) determining that the destination mode is logical; b) using a plurality of most significant bits in the destination field as the cluster identifier of a cluster and a plurality of least significant bits of the destination field as an interrupt controller identifier (ID) within the cluster of the one or more clusters; c) accessing, with use of the pointer, the data structure to retrieve a value of the bitmap of the entry corresponding to the cluster identifier; d) calculating a bitwise AND of the values for the interrupt controller ID and the bitmap of the entry; e) appending non-zero results of the bitwise AND with the cluster identifier to generate an updated value for the destination field; f) storing the updated value back into the destination field; and g) using the updated value in the destination field with values of the ICR to send the IPI onto the system bus.

In Example 15, the method of Example 10, wherein the guest OS of the VM is further to write a value for a destination shorthand to the ICR, the method further comprising: a) determining one of that the destination shorthand has been set to all including self or the destination field is programmed with all one values; b) determining, via a scan of the one or more entries of the data structure, each non-zero bitmap of the one or more entries; c) for a cluster that has a non-zero bitmap, merging the non-zero bitmap with the cluster identifier of the cluster to generate an updated value; d) storing the updated value in the destination field; e) setting the destination mode to logical; and f) using the updated value in the destination field and the destination mode to send the IPI onto a system bus coupled to the plurality of cores.

In Example 16, the method of Example 10, wherein the guest OS of the VM is further to write a value for a destination shorthand to the ICR, the method further comprising: a) determining that the destination shorthand has been set to all excluding self; b) determining, via a scan of the one or more entries of the data structure, each non-zero bitmap of the one or more entries, excluding any bitmap for a core of the subset of the plurality of cores from which the IPI is received; c) for a cluster that has a non-zero bitmap, merging the non-zero bitmap with the cluster identifier of the cluster to generate an updated value; d) storing the updated value in the destination field; e) setting the destination mode to logical; and f) using the updated value in the destination field and the destination mode to send the IPI onto a system bus coupled to the plurality of cores.

Various implementations may have different combinations of the structural features described above. For instance, all optional features of the processors and methods described above may also be implemented with respect to a system described herein and specifics in the examples may be used anywhere in one or more implementations.

Example 17 is a system comprising: 1) a memory device; and 2) a plurality of cores, wherein at least one of the plurality of cores is to execute a virtual machine monitor (VMM), and wherein to configure resources for a virtual machine (VM), the VMM is to: a) group the plurality of cores into one or more clusters, wherein a subset of the plurality of cores is to execute the VM; b) create, within a buffer in memory device, a data structure to store, for the subset of the plurality of cores, one or more entries, each entry of the one or more entries comprising a cluster identifier and a bitmap, wherein the bitmap identifies cores of the subset within a cluster corresponding to the cluster identifier; c) write, to a virtual machine control structure of the memory device: i) a pointer to the data structure, wherein the pointer comprises a physical address of the memory device; and ii) a number of the one or more entries in the data structure; and d) set, within the virtual machine control structure, a local interrupt controller pass-through field.

In Example 18, the system of Example 17, further comprising an interrupt command register (ICR), wherein a guest operating system (OS) of the VM is to write values to the ICR to send an inter-processor interrupt (IPI), the values to populate: i) a destination field that identifies one or more destination cores of the plurality of cores; and ii) a destination mode comprising one of physical or logical.

In Example 19, the system of Example 18, further comprising a programmable interrupt controller to: a) convert a value in the destination field into values for the cluster identifier of a cluster and an interrupt controller identifier (ID) within the cluster of the one or more clusters; b) access, with use of the pointer, the data structure to retrieve a value of the bitmap of the entry corresponding to the cluster identifier; c) calculate a bitwise AND of the values for the interrupt controller ID and the bitmap of the entry; and d) discard the values written to the ICR in response to the bitwise AND resulting in a zero value.

In Example 20, the system of Example 18, further comprising a programmable interrupt controller to: a) determine that the local interrupt controller pass-through field is set for the VM; b) determine that the pointer and the number of the one or more entries of the virtual machine control structure are non-zero; and c) send the IPI onto a system bus that couples the plurality of cores in response to verification, with use of the ICR, that the IPI is destined for one of the subset of the plurality of cores.

In Example 21, the system of Example 20, wherein, to determine the IPI is destined for one of the subset of the plurality of cores, the programmable interrupt controller is further to: a) determine that the destination mode is physical; b) convert a value in the destination field into values for the cluster identifier of a cluster and an interrupt controller identifier (ID) within the cluster of the one or more clusters; c) access, with use of the pointer, the data structure to retrieve a value of the bitmap of the entry corresponding to the cluster identifier; d) calculate a bitwise AND of the values for the interrupt controller ID and the bitmap of the entry; and e) determine that the interrupt controller ID is associated with one of the cores of the subset of the plurality of cores in response to the bitwise AND resulting in a non-zero value.

In Example 22, the system of Example 20, wherein, to determine the IPI is destined for one of the subset of the plurality of cores, the programmable interrupt controller is further to: a) determine that the destination mode is logical; b) use a plurality of most significant bits in the destination field as the cluster identifier of a cluster and a plurality of least significant bits of the destination field as an interrupt controller identifier (ID) within the cluster of the one or more clusters; c) access, with use of the pointer, the data structure to retrieve a value of the bitmap of the entry corresponding to the cluster identifier; d) calculate a bitwise AND of the values for the interrupt controller ID and the bitmap of the entry; e) append non-zero results of the bitwise AND with the cluster identifier to generate an updated value for the destination field; f) store the updated value back into the destination field; and g) use the updated value in the destination field with values of the ICR to send the IPI onto the system bus.

In Example 23, the system of Example 18, wherein the guest OS of the VM is further to write a value for a destination shorthand to the ICR, further comprising a programmable interrupt controller to: a) determine one of that the destination shorthand has been set to all including self or the destination field is programmed with all one values; b) determine, via a scan of the one or more entries of the data structure, each non-zero bitmap of the one or more entries; c) for a cluster that has a non-zero bitmap, merge the non-zero bitmap with the cluster identifier of the cluster to generate an updated value; d) store the updated value in the destination field; e) set the destination mode to logical; and f) use the updated value in the destination field and the destination mode to send the IPI onto a system bus coupled to the plurality of cores.

In Example 24, the system of Example 18, wherein the guest OS of the VM is further to write a value for a destination shorthand to the ICR, further comprising a programmable interrupt controller to: a) determine that the destination shorthand has been set to all excluding self; b) determine, via a scan of the one or more entries of the data structure, each non-zero bitmap of the one or more entries, excluding any bitmap for a core of the subset of the plurality of cores from which the IPI is received; c) for a cluster that has a non-zero bitmap, merge the non-zero bitmap with the cluster identifier of the cluster to generate an updated value; d) store the updated value in the destination field; e) set the destination mode to logical; and f) use the updated value in the destination field and the destination mode to send the IPI onto a system bus coupled to the plurality of cores.

Various implementations may have different combinations of the structural features described above. For instance, all optional features of the processors and methods described above may also be implemented with respect to a system described herein and specifics in the examples may be used anywhere in one or more implementations.

Example 25 is a non-transitory computer-readable medium storing instructions, which when executed by a processor having a core coupled to a system memory, cause the processor to execute a plurality of logic operations comprising: a) grouping, by a virtual machine monitor (VMM) executing on at least one core of a plurality of cores, the plurality of cores into one or more clusters, wherein a subset of the plurality of cores is to execute a virtual machine (VM); b) creating, by the VMM within a buffer in memory, a data structure to store, for the subset of the plurality of cores, one or more entries, each entry of the one or more entries comprising a cluster identifier and a bitmap, wherein the bitmap identifies cores of the subset within a cluster corresponding to the cluster identifier; c) writing, by the VMM, to a virtual machine control structure of the memory: i) a pointer to the data structure, wherein the pointer comprises a physical address of the memory; and ii) a number of the one or more entries in the data structure; and d) setting, by the VMM within the virtual machine control structure, a local interrupt controller pass-through field.

Various implementations may have different combinations of the structural features described above. For instance, all optional features of the processors and methods described above may also be implemented with respect to a system described herein and specifics in the examples may be used anywhere in one or more implementations.

Example 26 is a system comprising: a) means for grouping, by a virtual machine monitor (VMM), a plurality of cores into one or more clusters, wherein a subset of the plurality of cores is to execute a virtual machine (VM); b) means for creating a data structure to store, for the subset of the plurality of cores, one or more entries, each entry of the one or more entries comprising a cluster identifier and a bitmap, wherein the bitmap identifies cores of the subset within a cluster corresponding to the cluster identifier; c) means for writing, by the VMM, to a virtual machine control structure of memory: i) a pointer to the data structure, wherein the pointer comprises a physical address of the memory; and ii) a number of the one or more entries in the data structure; and d) means for setting, by the VMM within the virtual machine control structure, a local interrupt controller pass-through field.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to providing co-existence of trust domain architecture with multi-key total memory encryption technology in virtualized systems using trust domains in specific integrated circuits, such as in computing platforms or microprocessing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processing device, other implementations are applicable to other types of integrated circuits and logic devices. Similar techniques and teachings of implementations of the disclosure may be applied to other types of circuits or semiconductor devices that may benefit from higher pipeline throughput and improved performance. The teachings of implementations of the disclosure are applicable to any processing device or machine that performs data manipulations. However, the disclosure is not limited to processing devices or machines that perform 512 bit, 256 bit, 128 bit, 64 bit, 32 bit, or 16 bit data operations and may be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the below examples describe instruction handling and distribution in the context of execution units and logic circuits, other implementations of the disclosure may be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions may be used to cause a general-purpose or special-purpose processing device that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from. Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising: a plurality of cores, wherein at least one of the plurality of cores is to execute a virtual machine monitor (VMM), and wherein to configure resources for a virtual machine (VM), the VMM is to: group the plurality of cores into one or more clusters, wherein a subset of the plurality of cores is to execute the VM; create, within a buffer in memory, a data structure to store, for the subset of the plurality of cores, one or more entries, each entry of the one or more entries comprising a cluster identifier and a bitmap, wherein the bitmap identifies cores of the subset within a cluster corresponding to the cluster identifier; write, to a virtual machine control structure of the memory: a pointer to the data structure, wherein the pointer comprises a physical address of the memory; and a number of the one or more entries in the data structure; and set, within the virtual machine control structure, a local interrupt controller pass-through field.

2. The processor of claim 1, further comprising an interrupt command register (ICR), wherein a guest operating system (OS) of the VM is to write values to the ICR to send an inter-processor interrupt (IPI), the values to populate: a destination field that identifies one or more destination cores of the plurality of cores; and a destination mode comprising one of physical or logical.

3. The processor of claim 2, further comprising a programmable interrupt controller to: convert a value in the destination field into values for the cluster identifier of a cluster and an interrupt controller identifier (ID) within the cluster of the one or more clusters; access, with use of the pointer, the data structure to retrieve a value of the bitmap of the entry corresponding to the cluster identifier; calculate a bitwise AND of the values for the interrupt controller ID and the bitmap of the entry; and discard the values written to the ICR in response to the bitwise AND resulting in a zero value.

4. The processor of claim 2, further comprising a programmable interrupt controller to: determine that the local interrupt controller pass-through field is set for the VM; determine that the pointer and the number of the one or more entries of the virtual machine control structure are non-zero; and send the IPI onto a system bus that couples the plurality of cores in response to verification, with use of the ICR, that the IPI is destined for one of the subset of the plurality of cores.

5. The processor of claim 4, wherein, to determine the IPI is destined for one of the subset of the plurality of cores, the programmable interrupt controller is further to: determine that the destination mode is physical; convert a value in the destination field into values for the cluster identifier of a cluster and an interrupt controller identifier (ID) within the cluster of the one or more clusters; access, with use of the pointer, the data structure to retrieve a value of the bitmap of the entry corresponding to the cluster identifier; calculate a bitwise AND of the values for the interrupt controller ID and the bitmap of the entry; and determine that the interrupt controller ID is associated with one of the cores of the subset of the plurality of cores in response to the bitwise AND resulting in a non-zero value.

6. The processor of claim 4, wherein, to determine the IPI is destined for one of the subset of the plurality of cores, the programmable interrupt controller is further to: determine that the destination mode is logical; use a plurality of most significant bits in the destination field as the cluster identifier of a cluster and a plurality of least significant bits of the destination field as an interrupt controller identifier (ID) within the cluster of the one or more clusters; access, with use of the pointer, the data structure to retrieve a value of the bitmap of the entry corresponding to the cluster identifier; calculate a bitwise AND of the values for the interrupt controller ID and the bitmap of the entry; append non-zero results of the bitwise AND with the cluster identifier to generate an updated value for the destination field; store the updated value back into the destination field; and use the updated value in the destination field with values of the ICR to send the IPI onto the system bus.

7. The processor of claim 2, wherein the guest OS of the VM is further to write a value for a destination shorthand to the ICR, further comprising a programmable interrupt controller to: determine one of that the destination shorthand has been set to all including self or the destination field is programmed with all one values; determine, via a scan of the one or more entries of the data structure, each non-zero bitmap of the one or more entries; for a cluster that has a non-zero bitmap, merge the non-zero bitmap with the cluster identifier of the cluster to generate an updated value; store the updated value in the destination field; set the destination mode to logical; and use the updated value in the destination field and the destination mode to send the IPI onto a system bus coupled to the plurality of cores.

8. The processor of claim 2, wherein the guest OS of the VM is further to write a value for a destination shorthand to the ICR, further comprising a programmable interrupt controller to: determine that the destination shorthand has been set to all excluding self, determine, via a scan of the one or more entries of the data structure, each non-zero bitmap of the one or more entries, excluding any bitmap for a core of the subset of the plurality of cores from which the IPI is received; for a cluster that has a non-zero bitmap, merge the non-zero bitmap with the cluster identifier of the cluster to generate an updated value; store the updated value in the destination field; set the destination mode to logical; and use the updated value in the destination field and the destination mode to send the IPI onto a system bus coupled to the plurality of cores.

9. A method comprising: grouping, by a virtual machine monitor (VMM) executing on at least one core of a plurality of cores, the plurality of cores into one or more clusters, wherein a subset of the plurality of cores is to execute a virtual machine (VM); creating, by the VMM within a buffer in memory, a data structure to store, for the subset of the plurality of cores, one or more entries, each entry of the one or more entries comprising a cluster identifier and a bitmap, wherein the bitmap identifies cores of the subset within a cluster corresponding to the cluster identifier; writing, by the VMIM, to a virtual machine control structure of the memory: a pointer to the data structure, wherein the pointer comprises a physical address of the memory; and a number of the one or more entries in the data structure; and setting, by the VMM within the virtual machine control structure, a local interrupt controller pass-through field.

10. The method of claim 9, further comprising writing, by a guest operating system (OS) of the VM, values to an interrupt control register (ICR) to send an inter-processor interrupt (IPI), the values to populate: a destination field that identifies one or more destination cores of the plurality of cores; and a destination mode comprising one of physical or logical.

11. The method of claim 10, further comprising: reading a value in the destination field to determine the cluster identifier of a cluster and an interrupt controller identifier (ID) within the cluster of the one or more clusters; accessing, with use of the pointer, the data structure to retrieve a value of the bitmap of the entry corresponding to the cluster identifier; calculating a bitwise AND of the values for the interrupt controller ID and the bitmap of the entry; and discarding the values written to the ICR in response to the bitwise AND resulting in a zero value.

12. The method of claim 10, further comprising: determining that the local interrupt controller pass-through field is set for the VM; determining that the pointer and the number of the one or more entries of the virtual machine control structure are non-zero; and sending the IPI onto a system bus that couples the plurality of cores in response to verification, with use of the ICR, that the IPI is destined for one of the subset of the plurality of cores.

13. The method of claim 12, wherein, to determine the IPI is destined for one of the subset of the plurality of cores, the method further comprising: determining that the destination mode is physical; converting a value in the destination field into values for the cluster identifier of a cluster and an interrupt controller identifier (ID) within the cluster of the one or more clusters; accessing, with use of the pointer, the data structure to retrieve a value of the bitmap of the entry corresponding to the cluster identifier; calculating a bitwise AND of the values for the interrupt controller ID and the bitmap of the entry; and determining that the interrupt controller ID is associated with one of the cores of the subset of the plurality of cores in response to the bitwise AND resulting in a non-zero value.

14. The method of claim 12, wherein, to determine the IPI is destined for one of the subset of the plurality of cores, the method further comprising: determining that the destination mode is logical; using a plurality of most significant bits in the destination field as the cluster identifier of a cluster and a plurality of least significant bits of the destination field as an interrupt controller identifier (ID) within the cluster of the one or more clusters; accessing, with use of the pointer, the data structure to retrieve a value of the bitmap of the entry corresponding to the cluster identifier; calculating a bitwise AND of the values for the interrupt controller ID and the bitmap of the entry; appending non-zero results of the bitwise AND with the cluster identifier to generate an updated value for the destination field; storing the updated value back into the destination field; and using the updated value in the destination field with values of the ICR to send the IPI onto the system bus.

15. The method of claim 10, wherein the guest OS of the VM is further to write a value for a destination shorthand to the ICR, the method further comprising: determining one of that the destination shorthand has been set to all including self or the destination field is programmed with all one values; determining, via a scan of the one or more entries of the data structure, each non- zero bitmap of the one or more entries; for a cluster that has a non-zero bitmap, merging the non-zero bitmap with the cluster identifier of the cluster to generate an updated value; storing the updated value in the destination field; setting the destination mode to logical; and using the updated value in the destination field and the destination mode to send the IPI onto a system bus coupled to the plurality of cores.

16. The method of claim 10, wherein the guest OS of the VM is further to write a value for a destination shorthand to the ICR, the method further comprising: determining that the destination shorthand has been set to all excluding self; determining, via a scan of the one or more entries of the data structure, each non-zero bitmap of the one or more entries, excluding any bitmap for a core of the subset of the plurality of cores from which the IPI is received; for a cluster that has a non-zero bitmap, merging the non-zero bitmap with the cluster identifier of the cluster to generate an updated value; storing the updated value in the destination field; setting the destination mode to logical; and using the updated value in the destination field and the destination mode to send the IPI onto a system bus coupled to the plurality of cores.

17. A system comprising:
a memory; and
a plurality of cores, wherein at least one of the plurality of cores is to execute a virtual machine monitor (VMM), and wherein to configure resources for a virtual machine (VM), the VMM is to:
 group the plurality of cores into one or more clusters, wherein a subset of the plurality of cores is to execute the VM;
 create, within a buffer in memory device, a data structure to store, for the subset of the plurality of cores, one or more entries, each entry of the one or more entries comprising a cluster identifier and a bitmap, wherein the bitmap identifies cores of the subset within a cluster corresponding to the cluster identifier;

write, to a virtual machine control structure of the memory device: a pointer to the data structure, wherein the pointer comprises a physical address of the memory device; and a number of the one or more entries in the data structure; and set, within the virtual machine control structure, a local interrupt controller pass-through field.

18. The system of claim 17, further comprising an interrupt command register (ICR), wherein a guest operating system (OS) of the VM is to write values to the ICR to send an inter-processor interrupt (IPI), the values to populate: a destination field that identifies one or more destination cores of the plurality of cores; and a destination mode comprising one of physical or logical.

19. The system of claim 18, further comprising a programmable interrupt controller to: convert a value in the destination field into values for the cluster identifier of a cluster and an interrupt controller identifier (ID) within the cluster of the one or more clusters; access, with use of the pointer, the data structure to retrieve a value of the bitmap of the entry corresponding to the cluster identifier; calculate a bitwise AND of the values for the interrupt controller ID and the bitmap of the entry; and discard the values written to the ICR in response to the bitwise AND resulting in a zero value.

20. The system of claim 18, further comprising a programmable interrupt controller to: determine that the local interrupt controller pass-through field is set for the VM; determine that the pointer and the number of the one or more entries of the virtual machine control structure are non-zero; and send the IPI onto a system bus that couples the plurality of cores in response to verification, with use of the ICR, that the IPI is destined for one of the subset of the plurality of cores.

21. The system of claim 20, wherein, to determine the IPI is destined for one of the subset of the plurality of cores, the programmable interrupt controller is further to: determine that the destination mode is physical; convert a value in the destination field into values for the cluster identifier of a cluster and an interrupt controller identifier (ID) within the cluster of the one or more clusters; access, with use of the pointer, the data structure to retrieve a value of the bitmap of the entry corresponding to the cluster identifier; calculate a bitwise AND of the values for the interrupt controller ID and the bitmap of the entry; and determine that the interrupt controller ID is associated with one of the cores of the subset of the plurality of cores in response to the bitwise AND resulting in a non-zero value.

22. The system of claim 20, wherein, to determine the IPI is destined for one of the subset of the plurality of cores, the programmable interrupt controller is further to: determine that the destination mode is logical; use a plurality of most significant bits in the destination field as the cluster identifier of a cluster and a plurality of least significant bits of the destination field as an interrupt controller identifier (ID) within the cluster of the one or more clusters; access, with use of the pointer, the data structure to retrieve a value of the bitmap of the entry corresponding to the cluster identifier; calculate a bitwise AND of the values for the interrupt controller ID and the bitmap of the entry; append non-zero results of the bitwise AND with the cluster identifier to generate an updated value for the destination field; store the updated value back into the destination field; and use the updated value in the destination field with values of the ICR to send the IPI onto the system bus.

23. The system of claim 18, wherein the guest OS of the VM is further to write a value for a destination shorthand to the ICR, further comprising a programmable interrupt controller to: determine one of that the destination shorthand has been set to all including self or the destination field is programmed with all one values; determine, via a scan of the one or more entries of the data structure, each non-zero bitmap of the one or more entries; for a cluster that has a non-zero bitmap, merge the non-zero bitmap with the cluster identifier of the cluster to generate an updated value; store the updated value in the destination field; set the destination mode to logical; and use the updated value in the destination field and the destination mode to send the IPI onto a system bus coupled to the plurality of cores.

24. The system of claim 18, wherein the guest OS of the VM is further to write a value for a destination shorthand to the ICR, further comprising a programmable interrupt controller to: determine that the destination shorthand has been set to all excluding self, determine, via a scan of the one or more entries of the data structure, each non-zero bitmap of the one or more entries, excluding any bitmap for a core of the subset of the plurality of cores from which the IPI is received; for a cluster that has a non-zero bitmap, merge the non-zero bitmap with the cluster identifier of the cluster to generate an updated value; store the updated value in the destination field; set the destination mode to logical; and use the updated value in the destination field and the destination mode to send the IPI onto a system bus coupled to the plurality of cores.

* * * * *